(12) United States Patent
Kaneko

(10) Patent No.: US 6,240,544 B1
(45) Date of Patent: *May 29, 2001

(54) SIMULATION SYSTEM, SIMULATION EVALUATION SYSTEM, SIMULATION METHOD, AND COMPUTER-READABLE MEMORY CONTAINING A SIMULATION PROGRAM, HAVING LESS TRACE INFORMATION FOR REVERSE EXECUTION

(75) Inventor: Emi Kaneko, Kanagawa-Ken (JP)

(73) Assignee: Kabushiki Kaisha Toshiba, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/017,240

(22) Filed: Feb. 2, 1998

(30) Foreign Application Priority Data

Feb. 4, 1997 (JP) ................................... P9-021793

(51) Int. Cl.⁷ ....................................................... G06F 9/44
(52) U.S. Cl. ..................................................... 717/4; 717/9
(58) Field of Search ................................ 395/704; 717/4, 717/9

(56) References Cited

U.S. PATENT DOCUMENTS 5,870,607 * 2/1999 Netzer ................................... 395/704
6,014,515 * 1/2000 Burch ........................................ 717/4

OTHER PUBLICATIONS

Turbo Debugger 3,0, User's Guide, Borland Corporation Whole Manual, 1991.*
How Debuggers Work Algrithms, Data Structures and Architectures Chapters 1–11 and Glossary, 1996*

* cited by examiner

Primary Examiner—Tario R. Hafiz
Assistant Examiner—Todd Ingberg
(74) Attorney, Agent, or Firm—Foley & Lardner

(57) ABSTRACT

An execution processing module, while executing an execution module, stores an instruction type, and selectively stores a register value, a flag value, a branch source address, or a memory area value that may be updated by instruction execution according to the instruction type for use as trace data when a command read by a command reading module is a forward command. An UNDO execution processing module performs restoration processing using the trace data according to the instruction type when the command read by the command reading module is a backward command.

8 Claims, 22 Drawing Sheets

| ADDRESS | INSTRUCTION STRING | | INSTRUCTION TYPE/OPERATION |
|---|---|---|---|
| 0x1200 | SUBCC | Reg 9—Reg 2→Reg 7 | SUBTRACTION WHICH AFFECTS THE FLAG. THE RESULT IS STORED IN Reg 7 |
| 0x1204 | CMP | Reg 7, 0 | COMPARISON INSTRUCTION. THE RESULT IS NOT STRORED |
| 0x1208 | BNE | 0x1240 | IF THE N FLAG IS ON, CONTROL BRANCHES TO ADDRESS 0x1240 |
| 0x120C | STORE | Reg 7→[ADDRESS 5600] | THE VALUE OF Reg 7 IS STORED AT ADDRESS 5600 |
| 0x1240 | LOAD | [ADDRESS 8020]→Reg 9 | THE VALUE OF THE MEMORY AREA AT ADDRESS 8020 IS LOADED INTO Reg 9 |

FIG.3A
PRIOR ART

| INSTRUCTION | DESCRIPTION | SAVE THE DESTINATION OPERAND ONLY | SAVE BOTH DESTINATION AND SOURCE OPERANDS |
|---|---|---|---|
| A+B→A | ADD A TO B AND STORE THE RESULTING SUM INTO A | A=7 | A=4  A=3  A=7 |

FIG.3B
PRIOR ART

| ADDRESS | INSTRUCTION | DESCRIPTION | VALUE SAVED AS TRACE DATA |
|---|---|---|---|
| 0x1200 ⁓ 0x1240 | BRANCH 0x1240 | BRANCH TO ADDRESS 0x1240 | BRANCH DESTINATION ADDRESS : 0x1240 |

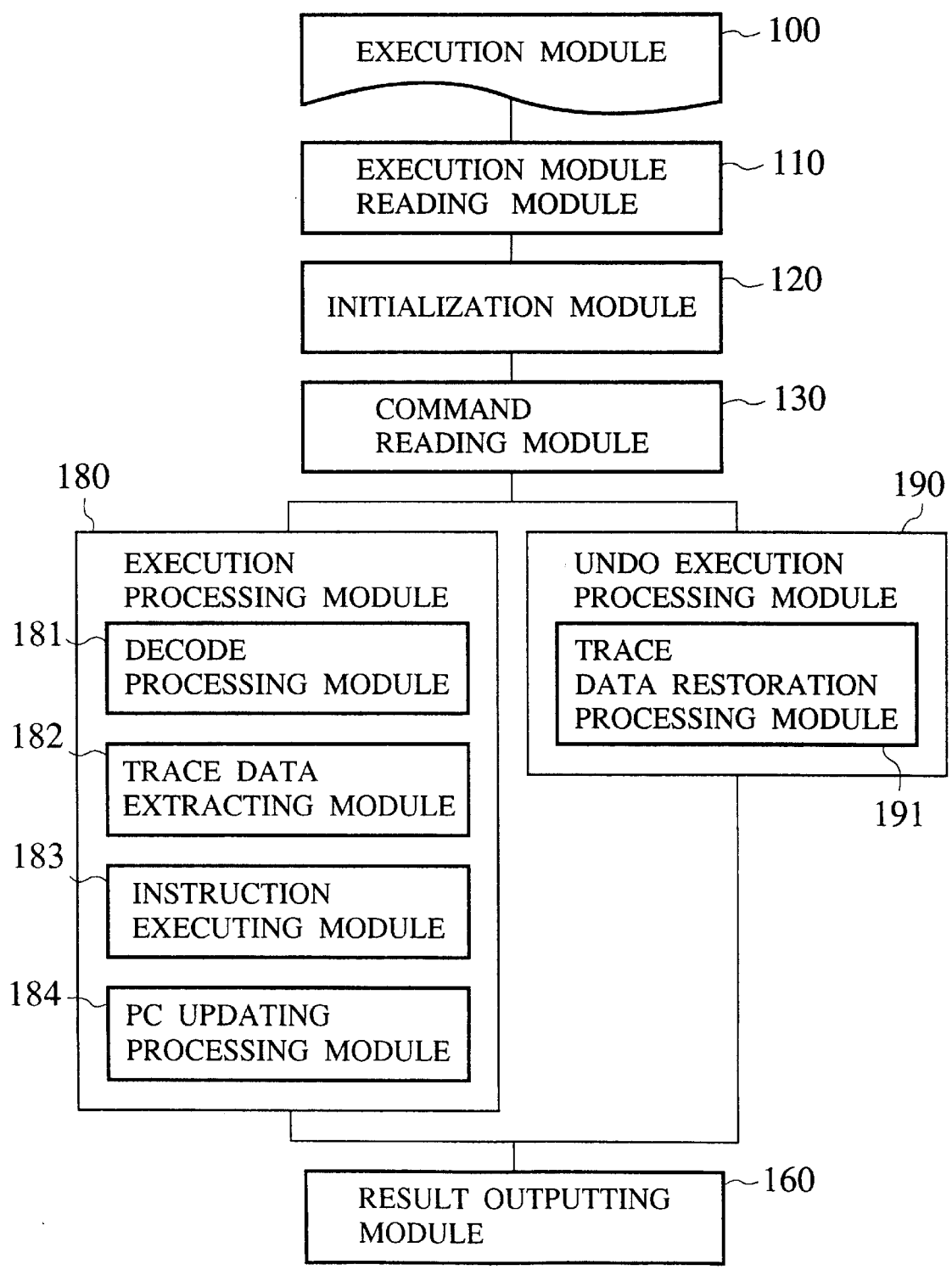

FIG.5
PRIOR ART

| | |
|---|---|
| 3136~3167 | <table><tr><td colspan="2"></td><td>100011011</td></tr><tr><td colspan="2"></td><td>SUBCC</td></tr></table> |
| 3138~3199 | <table><tr><td colspan="2">0100010010000000000010</td><td>0010001</td><td>000</td></tr><tr><td colspan="2">OP CODE (0x8ea24002)</td><td>Reg 9</td><td></td></tr></table> |
| 3200~3231 | <table><tr><td>00000000000000000000000000011</td><td>000</td></tr><tr><td>VALUE OF Reg 9 (0x3)</td><td>Reg 2</td></tr></table> |
| 3132~3163 | <table><tr><td>010</td><td>00000000000000000000000000000</td></tr><tr><td></td><td>VALUE OF Reg 2 (0x7)</td></tr></table> |
| 3164~3195 | <table><tr><td>111</td><td>0001 11</td><td>1111111111111111111111</td></tr><tr><td></td><td>Reg 7</td><td>VALUE OF Reg 7 AFTER OPERATION</td></tr></table> |
| 3196~3227 | <table><tr><td>111111100</td><td>0001 11</td><td>00000000000000000</td></tr><tr><td>(0xfffffff)</td><td>Reg 7</td><td>VALUE OF Reg 7 BEFORE</td></tr></table> |
| 3228~3259 | <table><tr><td>000000010000000</td><td>1000000100 1000011</td></tr><tr><td>OPERATION (0x80)</td><td>CMP OP CODE</td></tr></table> |
| 3260~3291 | <table><tr><td>110000010000000</td><td>0001 11</td><td>1111111111</td></tr><tr><td>(0x80a1e000)</td><td>Reg 7</td><td>VALUE OF Reg 7</td></tr></table> |
| 3292~3323 | <table><tr><td>11111111111111111111 00</td><td>00000000000</td></tr><tr><td>(0xfffffc0)</td><td>0 (ZERO) TO</td></tr></table> |
| 3324~3355 | <table><tr><td>00000000000000000000000</td><td>000100 10100</td></tr><tr><td>BE COMPARED WITH Reg 7</td><td>BNE OP CODE</td></tr></table> |
| 3356~3387 | <table><tr><td>000000000000000000000000</td><td>1</td><td>1101001000</td></tr><tr><td>(0x12800000)</td><td colspan="2">※ LOAD OP CODE</td></tr></table> |
| 3388~3419 | <table><tr><td>0000001100111110100010</td><td>0000000000</td></tr><tr><td>(0xd200afa2)</td><td>VALUE OF MEMORY</td></tr></table> |
| 3420~3451 | <table><tr><td>000000001101110000000</td><td>0010001</td><td>0000</td></tr><tr><td>ADDRESS 8020 (0x3700)</td><td>Reg 9</td><td>VALUE OF</td></tr></table> |
| 3452~3483 | <table><tr><td>00000000000000011011100000</td><td>0010</td></tr><tr><td>Reg 9 AFTER OPERATION( 0x3700 )</td><td>Reg 9</td></tr></table> |
| 3484~3515 | <table><tr><td>01</td><td>0000000000000000000000000000</td></tr><tr><td></td><td>VALUE OF Reg 9 BEFORE OPERATION (0x3)</td></tr></table> |
| 3516~ | 11 |

FIG.10

| ADDRESS | INSTRUCTION STRING | INSTRUCTION TYPE/OPERATION |
|---|---|---|
| ⁓ | ⁓ | |
| 0x1200 | SUBCC  Reg 9—Reg 2→Reg 7 | SUBTRACTION WHICH AFFECTS THE FLAG. THE RESULT IS STORED IN Reg 7 |
| 0x1204 | CMP  Reg 7, 0 | COMPARISON INSTRUCTION. THE RESULT IS NOT STRORED |
| 0x1208 | BNE  0x1240 | IF THE N FLAG IS ON, CONTROL BRANCHES TO ADDRESS 0x1240 |
| 0x120C | STORE  Reg 7→[ADDRESS 5600] | THE VALUE OF Reg 7 IS STORED AT ADDRESS 5600 |
| ⁓ | ⁓ | |
| 0x1240 | LOAD  [ADDRESS 8020]→Reg 9 | THE VALUE OF THE MEMORY AREA AT ADDRESS 8020 IS LOADED INTO Reg 9 |
| ⁓ | ⁓ | |

FIG.11A

DATA STRAGE TABLE DT [3]

| | | | ADDRESS WHERE PROCESSING STARTS |
|---|---|---|---|
| 3136~3167 | 0 0 0 0 1 1 | 0 0 0 | |
| | REGISTER NUMBER | VALUE | |
| 3168~3199 | 0 0 0 0 0 0 0 0 0 0 0 0 0 0 0 0 0 0 0 0 0 0 0 1 0 0 0 0 0 0 0 1 | | |
| | REGISTER VALUE (CONTINUED) · 0x80 | | FLAG |
| 3200~3231 | 0 1 1 | | |
| | TYPE | | |

FIG.11B

DATA STRAGE TABLE DT [4]

| | | | | |
|---|---|---|---|---|
| 0000~0031 | 0 0 0 0 0 0 0 0 0 0 1 0 0 1 | 0 0 0 0 0 0 0 0 0 0 0 0 0 0 0 0 0 0 | | |
| | TYPE TYPE | REGISTER NUMBER | REGISTER VALUE 3 | |
| 0032~0063 | 0 0 0 0 0 0 0 0 0 1 1 | 0 0 0 0 0 0 0 0 0 0 0 0 0 0 0 0 0 0 0 0 1 | | |
| | REGISTER VALUE (CONTINUED) | BRANCH SOURCE ADDRESS (ADDRESS 0x1208) | | |
| 0064~0095 | 0 0 1 0 0 0 0 0 1 0 0 0 | 1 1 0 | | |
| | BRANCH SOURCE ADDRESS (CONTINUED) | TYPE | ADDRESS WHERE PROCESSING ENDS | |

FIG.15

| ADDRESS | INSTRUCTION STRING | INSTRUCTION TYPE/OPERATION |
|---|---|---|
| 0x1200 | SUBCC  Reg 9←Reg 2→Reg 9 | REVERSIBLE SUBTRACTION INSTRUCTION. THE RESULT IS STORED IN Reg 9 |
| 0x1204 | CMP  Reg 7, 0 | COMPARISON INSTRUCTION. THE RESULT IS NOT STRORED |
| 0x1208 | BNE  0x1240 | IF THE N FLAG IS ON, CONTROL GOES TO ADDRESS 0x1240 |
| 0x120C | STORE  Reg 7→[ADDRESS 5600] | THE VALUE OF Reg 7 IS STORED AT MEMORY ADDRESS 5600 |
| 0x1240 | LOAD  [ADDRESS 8020]→Reg 9 | THE VALUE AT MEMORY ADDRESS 8020 IS LOADED INTO Reg 9 |

FIG.16

DATA STRAGE TABLE DT [3]

| Address range | | | | | |
|---|---|---|---|---|---|
| 3136~3167 | | | 1 0 1 0 | 0 0 0 0 | ← ADDRESS WHERE PROCESSING STARTS |
| | | | VALUE | VALUE | |
| 3168~3199 | 0 0 0 0 1 0 0 1 | 1 0 0 0 0 0 0 0 0 0 0 0 0 0 0 0 0 0 0 0 0 0 0 0 | | | |
| | TYPE / REGISTER NUMBER | REGISTER VALUE 3 | | | |
| 3200~3231 | 0 0 0 0 0 0 1 1 | 0 0 0 0 0 0 0 0 0 0 0 0 0 0 0 0 0 0 0 0 0 0 0 1 | | | |
| | REGISTER VALUE (CONTINUED) | BRANCH SOURCE ADDRESS (0x1208) | | | |
| 3232~3265 | 0 0 0 0 1 0 0 0 | 0 1 1 0 | | | ← ADDRESS WHERE PROCESSING ENDS |
| | BRANCH SOURCE ADDRESS (CONTINUED) | TYPE | | | |

SIMULATION SYSTEM, SIMULATION EVALUATION SYSTEM, SIMULATION METHOD, AND COMPUTER-READABLE MEMORY CONTAINING A SIMULATION PROGRAM, HAVING LESS TRACE INFORMATION FOR REVERSE EXECUTION

BACKGROUND OF THE INVENTION

1. Field of the Invention

The present invention relates to a simulation system, a simulation evaluation system, a simulation method, and a computer-readable memory containing a simulation program, and more particularly to a technique for allowing a user to undo instructions several times, reduces the amount of trace data on an instruction that is required for later undoing, and for increasing simulation operability.

2. Description of the Related Art

A simulation system is executed in one of two modes. In one mode, an execution module is read and executed until either the end of the module or a specified breakpoint is reached. In the other mode, a simulation system is started and, after the execution module is read, interaction with a user is executed according to the entered commands.

FIG. 1 is a diagram showing the configuration of a first conventional simulation system which executes simulation interactively. This simulation system comprises an execution module reading module 110 which reads an execution module 100, an initialization module 120 which initializes various variables used for simulation, a command reading module 130 which reads commands entered by an operator, an execution processing module 170 which executes the simulation of the execution module 100 as instructed by a command read by the command reading module 130, and a result outputting module 160 which outputs the result of simulation executed by the execution processing module 170.

When a developed program is executed by a simulation system, the execution module is executed by the simulation system until the end of the module is reached. If, for example, the execution result is not valid or the simulation system runs incorrectly, it is determined that the program has bugs. In this case, the execution module is executed interactively, one or more steps at a time, to determine the cause of the problem.

FIG. 2 is a flowchart showing the processing of the simulation system of FIG. 1. First, the simulation system reads an execution module(step S151) and initializes the variables necessary for simulation(step S152). Then, the system reads a command entered into the system by an operator(step S153). A command entered in this step executes the program until a specified breakpoint is reached, executes the program one step at a time, or ends the program.

In step S154, the system checks if the entered command will execute the program until a breakpoint is reached. If it is, the system repeats the step execution processing S157 until the breakpoint is reached (step S155) and then continues processing according to the next command (step S153). In step S156, the system checks if the entered command will execute the program, one step at a time. If it is, the system executes the step execution processing S157 and then continues processing according to the next command (step S153). In step S158, the system checks if the entered command will end processing. If it is, the system ends simulation processing.

In such a system described above, the user sometimes wants to return control to a location several steps before the current location when control is passed beyond a user-intended location or when an expected result is not obtained after executing several steps. However, the conventional simulation system cannot return control backward. This means that, when such a need arises, simulation must be executed from the beginning. This degrades program development efficiency.

Next, a second conventional simulation system is described. The program explained below saves "trace data", which is the history data on program execution, for use in program debugging. Use of this data allows the simulation system to return control backward through the program. However, the trace data in the conventional system must include various types of data including instruction addresses, registers, memory contents, and flag values.

In addition, for an instruction stored at a particular address, this simulation system saves the "after" value of an operand produced as a result of instruction execution. However, executing the program in the reverse sequence, with only the value of the destination operand (a register or a memory location receiving the result of instruction execution) saved as shown in the examples below, does not restore the value of the operand correctly. In this case, executing the program in the reverse sequence also requires the value of the source operand (a register or a memory location supplying a value for instruction execution) to be saved.

Example 1: Arithmetic instruction

Assume that the program starts with A=4 and B=3. When the result of addition "A+B" is stored in "A", the value of "A" in the conventional trace data is "7" as shown in FIG. 3A. When this instruction is undone and "7" is restored into "A", the source operand "A" is also set to "7". Therefore, re-executing this instruction does not give a correct result. In such a case, not only the destination operand but also the source operand must be saved.

Example 2: Branch instruction

When executing a branch instruction, the conventional trace data saves only the "branch destination" address. Therefore, as shown in FIG. 3B, when an attempt is made to undo the branch instruction after control is passed to address 0x1240, the address from which control has been passed to address 0x1240 is unknown. In such a case, the branch source address must also be saved.

FIG. 4 is a diagram showing the configuration of the second conventional simulation system. This simulation system comprises an execution module reading module 110 which reads an execution module 100, an initialization module 120 which initializes various variables used for simulation, a command reading module 130 which reads commands entered by an operator, an execution processing module 180 which executes the simulation of the execution module 100 as instructed by a command read by the command reading module 130, an UNDO execution processing module 190 which restores trace data on an instruction back to the before-execution state of the instruction as instructed by the command entered from the command reading module 130, and a result outputting module 160 which outputs the result of simulation executed by the execution processing module 180 or by the UNDO execution processing module 190.

The simulation system with the configuration described above must save a large amount of trace data as described above. FIG. 5 shows trace data required for the second conventional simulation system. As shown in the figure, a 358-bit table is required for an instruction because various types of data must be saved including registers, register values, and OP codes ("*" in the figure is a flag indicating whether or not the BNE (Branch Not Equal) instruction caused a branch).

As described above, the first conventional simulation system cannot pass control backward, degrading program development efficiency. The second conventional simulation system requires more trace data as the program size increases, causing a storage capacity problem.

Another method for high-speed simulation is to use a hardware emulator which executes an execution module. However, it is usually difficult for an emulation system to pass control backward.

SUMMARY OF THE INVENTION

In view of the foregoing, it is an object of the present invention to provide a simulation system which allows a user to undo instructions two or more times and which reduces the amount of trace data required to undo an instruction in order to store trace data on as many instructions as possible.

To achieve the above object, there is provided a simulation system which stores an instruction type and selectively stores a register value, a flag value, a branch source address, or a memory area value that may be updated by instruction execution according to the instruction type for use as trace data when an instruction is executed and which performs restoration processing using the trace data according to the instruction type when the instruction is restored to a state before execution.

The configuration of the system of the above-described invention allows trace data to be stored selectively according to the instruction type. The ability to select data to be stored according to the instruction type reduces the amount of trace data on one instruction necessary to undo it, making it possible to store trace data on more instructions. Therefore, the operability of the simulation system is increased.

To achieve the above object, there is provided a simulation system comprising an execution module reading module for reading an execution module to be simulated; an initialization module for initializing variables used for simulation; a command reading module for reading a command indicating a simulation processing type; an execution processing module for executing the execution module and for storing an instruction type and selectively storing a register value, a flag value, a branch source address, or a memory area value that may be updated by instruction execution according to the instruction type for use as trace data when the command read by the command reading module is a forward command; and an UNDO execution processing module for performing restoration processing using the trace data according to the instruction type when the command read by the command reading module is a backward command.

In the above description, the forward command refers to a command entered by an operator to execute the execution module in the order in which instructions appear. The backward command refers to a command used by the operator to undo the execution of instructions of the execution module. In the configuration of the system according to the above invention, the execution processing module stores trace data selectively according to the instruction type, and the UNDO execution processing module undoes instructions by executing the execution module in the reverse order in which instructions appear by restoring trace data. Therefore, in addition to the advantages of the invention described above, the system allows the operator to enter a command to execute the execution module both in a forward direction and in a backward direction, further increasing the operability of the simulation system.

A preferred embodiment of the present invention is a simulation system wherein the execution processing module comprises a first data storage processing module, when the command read by the command reading module is the forward command, while executing the execution module, for storing the type of the instruction being executed and selectively storing a register number and the register value if the register value is updated by executing the instruction, the flag value if the flag value is updated by executing the instruction, a memory area address and the memory area value if the memory area value is updated by executing the instruction, and the branch source address of a branched-to address instruction.

In the above embodiment, the system stores an instruction type and trace data specific to the instruction type. Storing trace data, and selecting data to be stored, according to the instruction type reduces the amount of trace data on one instruction necessary to undo it, making it possible to store trace data on more instructions. Therefore, the operability of the simulation system is increased.

A preferred embodiment of the present invention is a simulation system wherein the UNDO execution processing module comprises a first data restoration processing module, when the command read by the command reading module is the backward command, while undoing the execution module, according to the instruction type stored in the first data storage processing module, for restoring the stored register value into a register with the register number stored in the first data storage processing module if the register value is updated by executing the instruction, restoring the flag value stored in the first data storage processing module into a flag if the flag value is updated by executing the instruction, restoring the memory area value into a memory area with the address stored in the first data storage processing module if the memory area value is updated by executing the instruction, and restoring the branch source address into a program counter if the instruction is a branched-to address instruction.

In the above embodiment, the system stores an instruction type and trace data specific to the instruction type. Storing trace data, and selecting data to be stored, according to the instruction type reduces the amount of trace data on one instruction necessary to undo it, making it possible to store trace data on more instructions. Therefore, the operability of the simulation system is increased.

A preferred embodiment of the present invention is a simulation system wherein the execution processing module comprises a second data storage processing module, when the command read by the command reading module is the forward command, for storing the type of the instruction being executed while executing the execution module and wherein the UNDO execution processing module comprises a second data restoration processing module for restoring the instruction to the state before execution by reversing the instruction when the instruction is a reversible instruction.

In the above description, the reversible instruction refers to an instruction in which, after operation, the value of one operand may be restored using the values of other operands. For a reversible instruction, performing reverse operation allows the value of one operand to be restored, thus eliminating the need for the value of that operand to be stored. Therefore, the above embodiment further reduces the amount of trace data.

To achieve the above object, there is provided a simulation evaluation system which stores information on an instruction when the instruction is executed by an emulation system and which restores the instruction to a state before execution using the information, wherein the simulation evaluation system stores an instruction type and selectively stores a register value, a flag value, a branch source address, or a memory area value that may be updated by instruction execution according to the instruction type for use as trace data and, when the instruction is restored to the state before execution by the emulation system, performs data restoration processing using the trace data.

In the configuration of the above invention where a simulation system capable of undoing instruction execution is added to a hardware emulator, instruction undoing which is impossible or difficult for the emulator to do alone may be done.

To achieve the above object, there is provided a simulation method comprising the steps of reading an execution module to be simulated; initializing variables used for simulation; reading a command indicating a simulation processing type; executing the execution module, storing an instruction type, and selectively storing a register value, a flag value, a branch source address, or a memory area value that may be updated by instruction execution according to the instruction type for use as trace data when the command read by the command reading module is a forward command; and performing restoration processing using the trace data according to the instruction type when the command read by the command reading module is a backward command.

In the above description, the forward command refers to a command entered by an operator to execute the execution module in the order in which instructions appear. The backward command refers to a command used by the operator to undo the execution of an instruction of the execution module. In the configuration of the system according to the above invention, the execution processing module stores trace data selectively according to the instruction type, and the UNDO execution processing module undoes instructions by executing the execution module in the reverse order in which instructions appear by restoring trace data. Therefore, the system allows the operator to enter a command to execute the execution module both in a forward direction and in a backward direction, further increasing the operability of the simulation system.

To achieve the above object, there is provided a computer-readable memory having stored therein a simulation program which stores information on an instruction when the instruction is executed and which restores the instruction to a state before execution using the information, the program comprising a step for reading an execution module to be simulated; a step for initializing variables used for simulation; a step for reading a command indicating a simulation processing type; a step for executing the execution module, storing an instruction type, and selectively storing a register value, a flag value, a branch source address, or a memory area value that may be updated by instruction execution according to the instruction type for use as trace data when the command read by the command reading module is a forward command; and a step for performing restoration processing using the trace data according to the instruction type when the command read by the command reading module is a backward command.

In the above description, the forward command refers to a command entered by an operator to execute the execution module in the order in which instructions appear. The backward command refers to a command used by the operator to undo the execution of an instruction of the execution module. In the configuration of the system according to the above invention, the execution processing module stores trace data selectively according to the instruction type, and the UNDO execution processing module undoes instructions by executing the execution module in the reverse order in which instructions appear by restoring trace data. Therefore, the system allows the operator to enter a command to execute the execution module both in a forward direction and in a backward direction, further increasing the operability of the simulation system.

The nature, principle and utility of the invention will become more apparent from the following detailed description when read in conjunction with the accompanying drawings.

BRIEF DESCRIPTION OF THE DRAWINGS

In the accompanying drawings:

FIGS. 3A and 3B are diagrams showing how processing is performed in the first conventional simulation system when an arithmetic instruction is executed and when a branch instruction is executed, respectively;

FIG. 4 is a block diagram showing the configuration of a second conventional simulation system;

FIG. 5 is a diagram showing trace data saved by the second conventional simulation system;

FIG. 10 is a diagram showing an input program used in the first embodiment;

FIGS. 11A and 11B are diagrams showing data storage tables into which data is stored during execution of the input program of FIG. 10;

FIG. 15 is a diagram showing an input program used in the second embodiment;

FIG. 16 is a diagram showing a data storage table into which data is stored during execution of the input program of FIG. 15;

DESCRIPTION OF THE PREFERRED EMBODIMENTS

Figure 1:
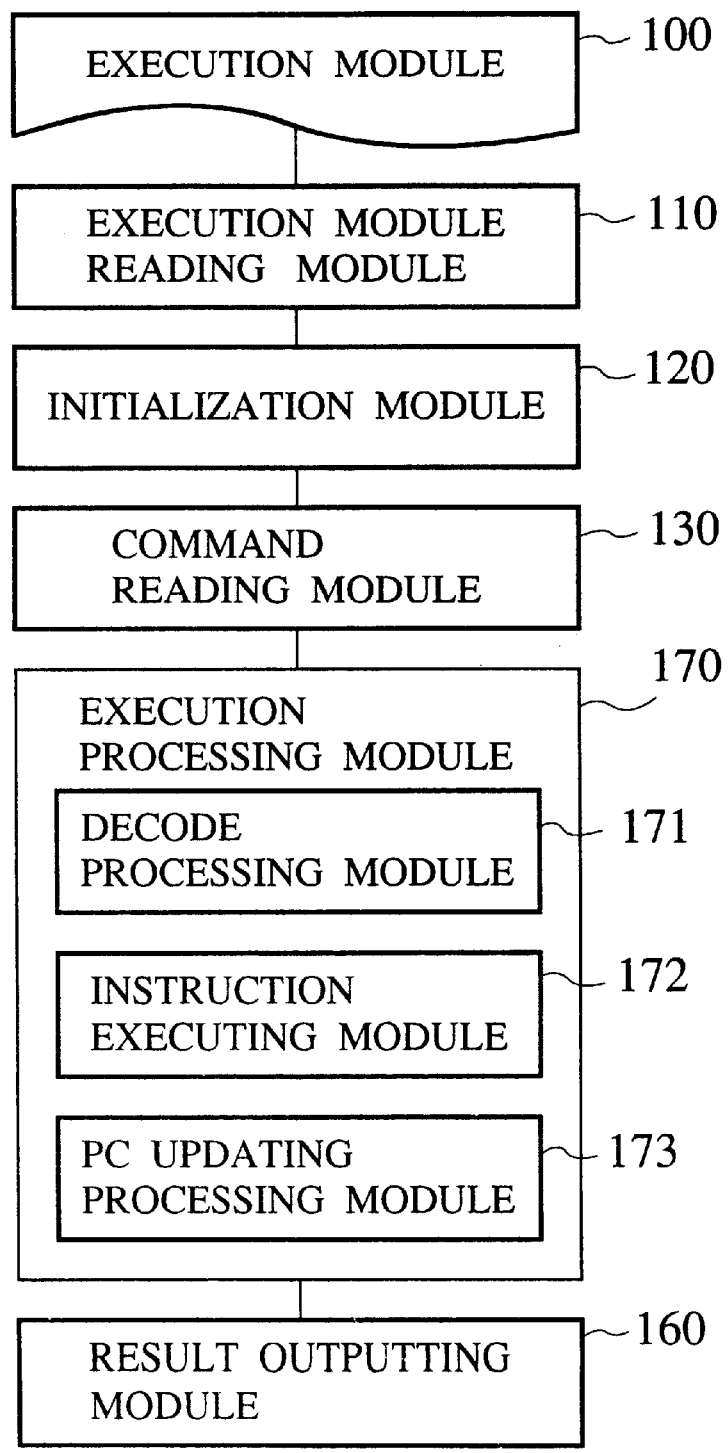
FIG. 1 is a block diagram showing a first conventional simulation system.
Figure 2:
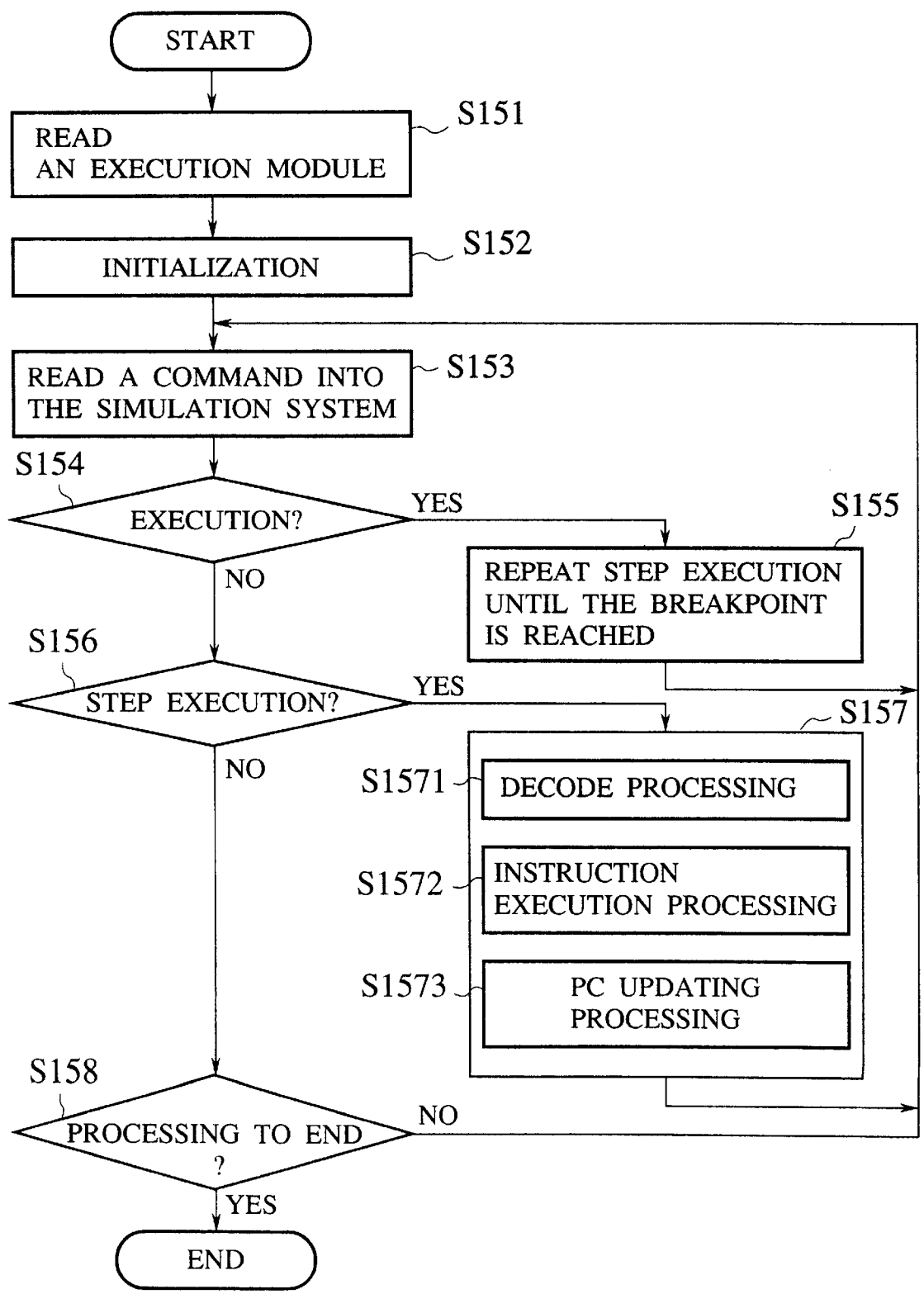
FIG. 2 is a flowchart showing a first conventional simulation method.

A simulation system, a simulation evaluation system, a simulation method, and a computer-readable memory containing a simulation program are described in detail below with reference to the drawings.

First embodiment

First, the terms used in the following description are described. UNDO processing refers to the cancellation of the effect of the most recent instruction. A data storage table is a table where the values necessary for UNDO processing are stored. A plurality of data storage tables are provided. Each table has a size, represented as "SIZE", before data is stored therein. A table which contains data is compressed except when data is being added to the table or when the table is being referenced. In this embodiment, each of these tables is abbreviated to "DT". A particular table is represented as "DT[N]" where N is a sequential table number. An address within DT[N] is represented as "DT[N][i]" where i is a sequential address within the table. If the end address of DT[N] exceeds the SIZE after data is stored, the end address is assigned to SIZE[N] as the size of DT[N]. Note that a table is compressed in order to reduce the size of the area where trace data is stored.

An UNDO breakpoint, one of the terms concerning simulation system operation, refers to an address where UNDO execution is to end. Step execution refers to the execution of one instruction of an execution module by the simulation system. UNDO step execution refers to the cancellation of the effect of one most recent instruction. UNDO execution refers to the cancellation of the effects of a sequence of instructions, in reverse sequence beginning with the most recent instruction, until the UNDO breakpoint is reached.

There are the following types of instructions. A register instruction is an instruction which updates the value of a register (an arithmetic instruction such as an addition or subtraction instruction, or load instruction, etc.). A flag change instruction is a register instruction which changes the value of a flag. A flag no-change instruction is a register instruction which does not change the value of a flag. A memory instruction is an instruction which changes the value of a memory location (store instruction, etc.). A branched-to address instruction is an instruction located at a branch destination whose program counter (PC) contains an address at least two instructions away from the address in the PC of the most recent instruction. If the most recent instruction is a conditional branch instruction which did not branch, or is a conditional branch instruction which branched but is located only one instruction away, the branched-to address instruction is not considered a branched-to address instruction.

The terms relating to the size of data added to a table are as follows. A register number size refers to the number of bits used to identify a register number. For example, when there are 64 registers, six bits are required ($2^6$=64). A register size refers to the number of bits of a value which can be stored in a register. For example, it is 32 bits. A memory address size refers to the number of bits required to identify a memory address. It is 32 bits when the address space is $2^{32}$ bytes. A memory size refers to the number of bits of a value which can be stored in memory. For example, it is 32 bits. An instruction address size refers to the number of bits required to identify an instruction address. It is 32 bits when the address space is $2^{32}$ bytes. A flag size refers to the number of bits required to identify all flags (condition codes). In this embodiment, there are four flags, N (Negative), Z (Zero), V (Overflow), and C (Carry). Therefore, the flag size is four bits with the value retained in the sequence of "NZVC". When a fag is 1, the state is on.

Variables are defined as follows. VAL is a 3-bit variable containing a value identifying the type of an instruction added to a DT. PC, FPC, and NPC are program counters: PC contains the address of the current instruction, FPC contains the address of the immediately-preceding (forward) instruction, and NPC contains the address of the next instruction.

Figure 6:
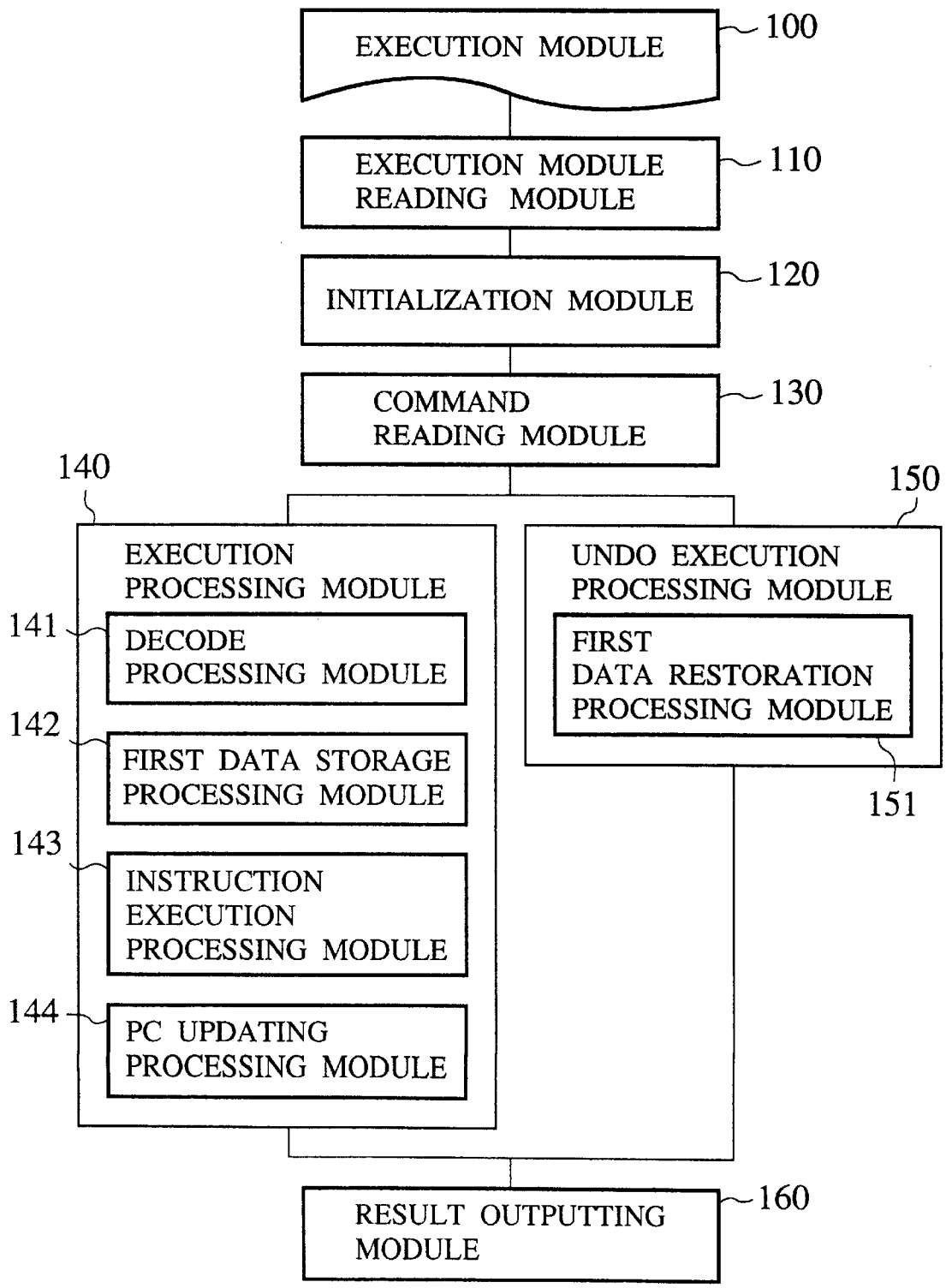
FIG. 6 is a block diagram showing the configuration of a simulation system according to a first embodiment of the present invention.

FIG. 6 is a diagram showing the configuration of a simulation system used in a first embodiment. The simulation system used in the first embodiment of the present invention comprises an execution module reading module 110 which reads an execution module 100, an initialization module 120 which initializes various variables used for simulation, a command reading module 130 which reads commands entered by an operator, an execution processing module 140 which executes the instructions contained in the execution module 100 and which comprises a decode processing module 141, a first data storage processing module 142, an instruction execution processing module 143, and a PC updating processing module 144, an UNDO execution processing module 150 which comprises a first data restoration processing module 151 and which returns an instruction to the state before execution by restoring trace data according to a command entered by the operator via the command reading module 130, and a result outputting module 160 which outputs the result of the execution processing module 140 or the UNDO execution pressing module 150.

The operation of the simulation system is described with reference to FIG. 6. The execution module reading module 110 reads the execution module 100 as input to the simulation system. The initialization module 120 initializes the PC, NPC, FPC, data storage table number (N), and address (i) within the data storage table [N]. The command reading module 130 reads a command entered into the simulation system. The decode processing module 141 reads an instruction pointed to by the PC, gets a mnemonic and operands from the instruction and, based on the mnemonic, identifies the type of the instruction. The instruction execution processing module 143 causes the simulation system to execute the instruction at an address pointed to by the PC. The PC updating processing module 144 stores the content of the PC into the FPC, and the content of the NPC into the PC. For a non-branch instruction, the PC updating processing module 144 increments the NPC by the size of one instruction; for a branch instruction, the module stores the branch destination address in the NPC.

Figure 7:
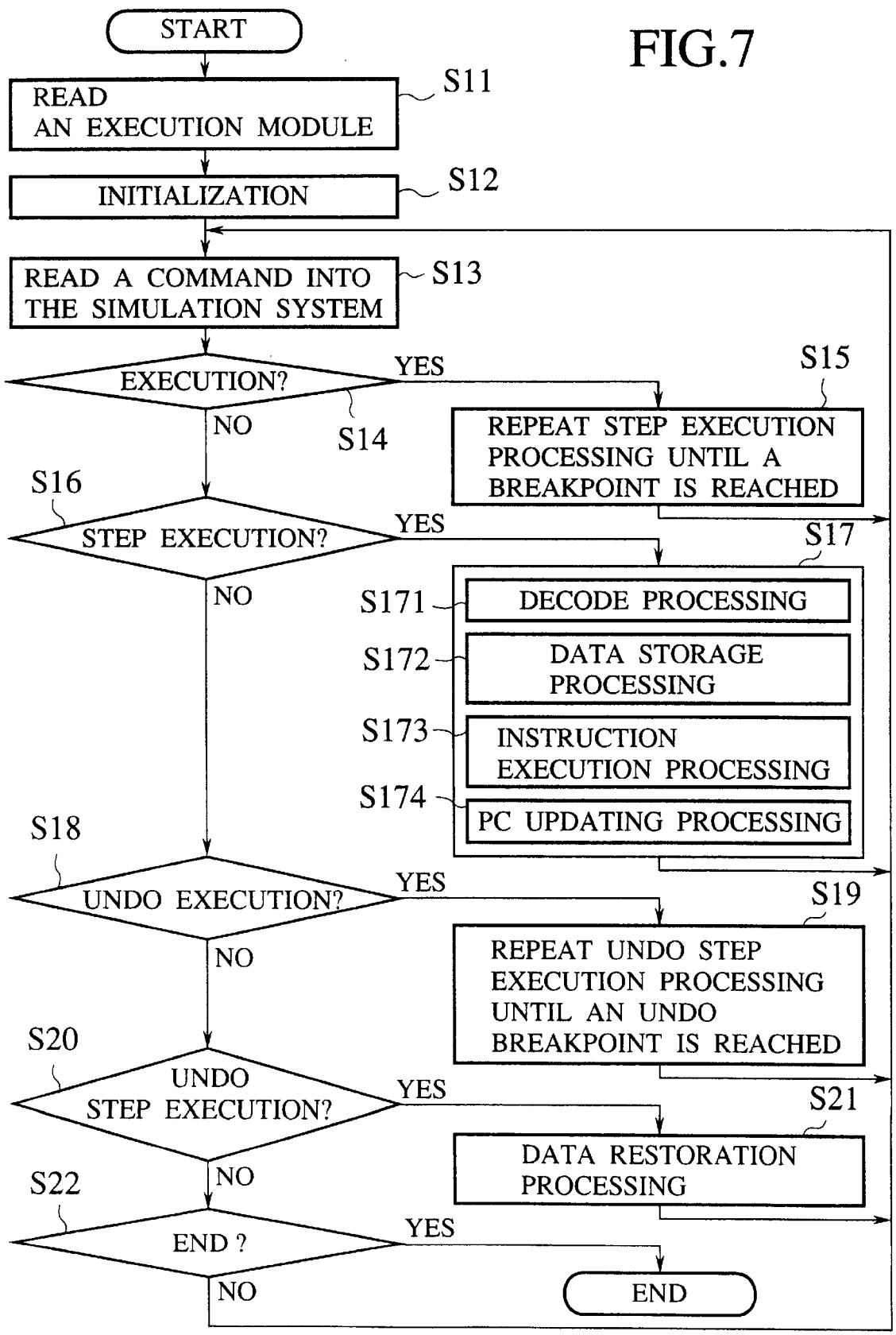
FIG. 7 is a flowchart showing processing performed by a simulation method according to the first embodiment of the present invention.

FIG. 7 is a flowchart showing the general processing flow of the simulation system shown in FIG. 6.

First, the simulation system reads an execution module (step S11) and initializes the variables such as PC, NPC, FPC, data storage table number (N), and address (i) within the data storage table [N](step S12). In step S13, the simulation system reads a command. If the system finds in step S14 that the entered command is an "execution" command, it passes control to step S15 and repeats step S17 until a specified breakpoint or the end of the execution module is reached. If the system finds in step S16 that the entered command is a "step execution" command, it executes decode processing S171, data storage processing S172, instruction execution processing S173, and PC updating processing S174 and returns control to step S13. If the system finds in step S18 that the entered command is an "UNDO execution" command, it repeats UNDO step execution until an UNDO breakpoint or the beginning of the execution module is reached. If the system finds in step S20 that the entered command is an "UNDO step execution" command, it executes data restoration processing S21 and returns control to step S13. If the system finds in step S22 that the entered command is an "end" command, it ends simulation.

Next, processing executed by the first data storage processing module 142 is described with reference to the flowchart shown in FIGS. 8A and 8B. Note that, in the following description, a numeric value preceded by "0b" is binary.

If the module finds in step S31 that the counter i containing an address within the data storage table DT[N] is equal to or larger than SIZE, it sets the size of DT[N], SIZE[N], to "i". The module compresses DT[N] and initializes the counter i to 0 (step S32). If i=0 in step S33, the module increments N by 1 and prepares the next table DT[N]. In step S35, if the mnemonic obtained by the decode processing module 141 is a flag change instruction, control goes to step S36. In step S36, "0b11" is assigned to VAL, the register number is stored in the field with the size of the register number beginning with DT[N][i], i is incremented by register number size, the register value is stored in the field with the size of the register beginning with DT[N][i], i is incremented by register size, the flag value is stored in the field with the size of the flag beginning with DT[N][i], i is incremented by flag size, and control goes to step S41.

In step S37, if the mnemonic is a flag no-change instruction, control goes to step S38. In step S38, "0b10" is assigned to VAL, and the register number, register value, and flag value are stored in the field beginning with DT[N][i]. Then, control goes to step S41.

In step S39, if the mnemonic is a memory instruction, control goes to step S40. In step S40, "0b01" is assigned to VAL, the memory-address is stored in the field with the size of the memory address size beginning with DT[N][i], i is incremented by memory address size, the memory area value is stored in the field with the size of the memory area size beginning with DT[N][i], i is incremented by memory area size, and control goes to step S41.

In step S41, if the mnemonic is a branched-to address instruction, control goes to step S42. In step S42, VAL is ORed with "0b100", the return address is stored in the field with the size of the instruction address size beginning with DT[N][i], i is incremented by instruction address size, and control goes to step S44. If the mnemonic is not a branched-to address instruction, VAL is ORed with "0b000" in step S43.

In step S44, VAL is stored in the 3-bit field beginning with DT[N][i] and i is incremented by 3.

Figure 8A:
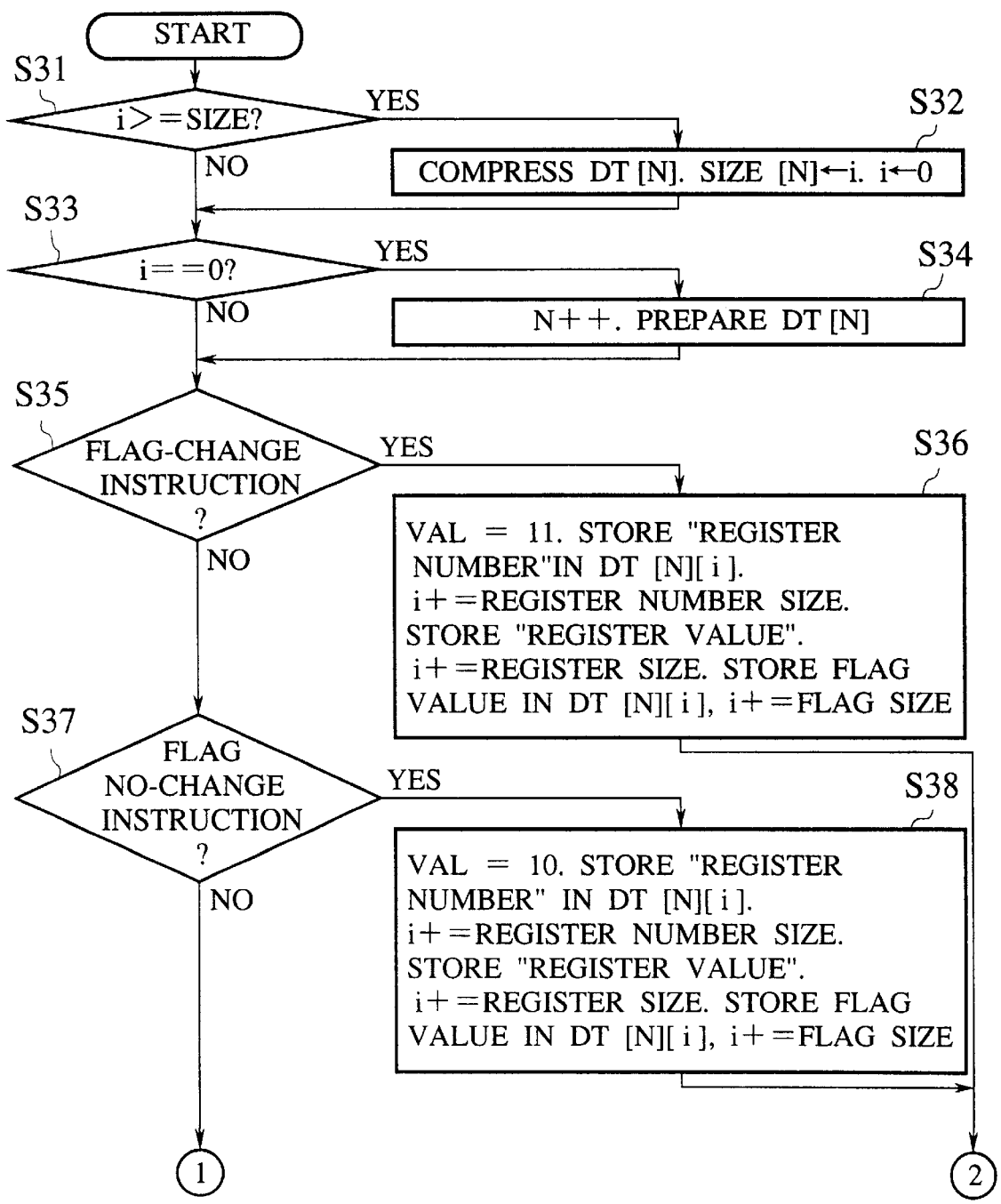
FIGS. 8A and 8B are flowcharts showing processing performed by a first data storage processing module.
Figure 8B:
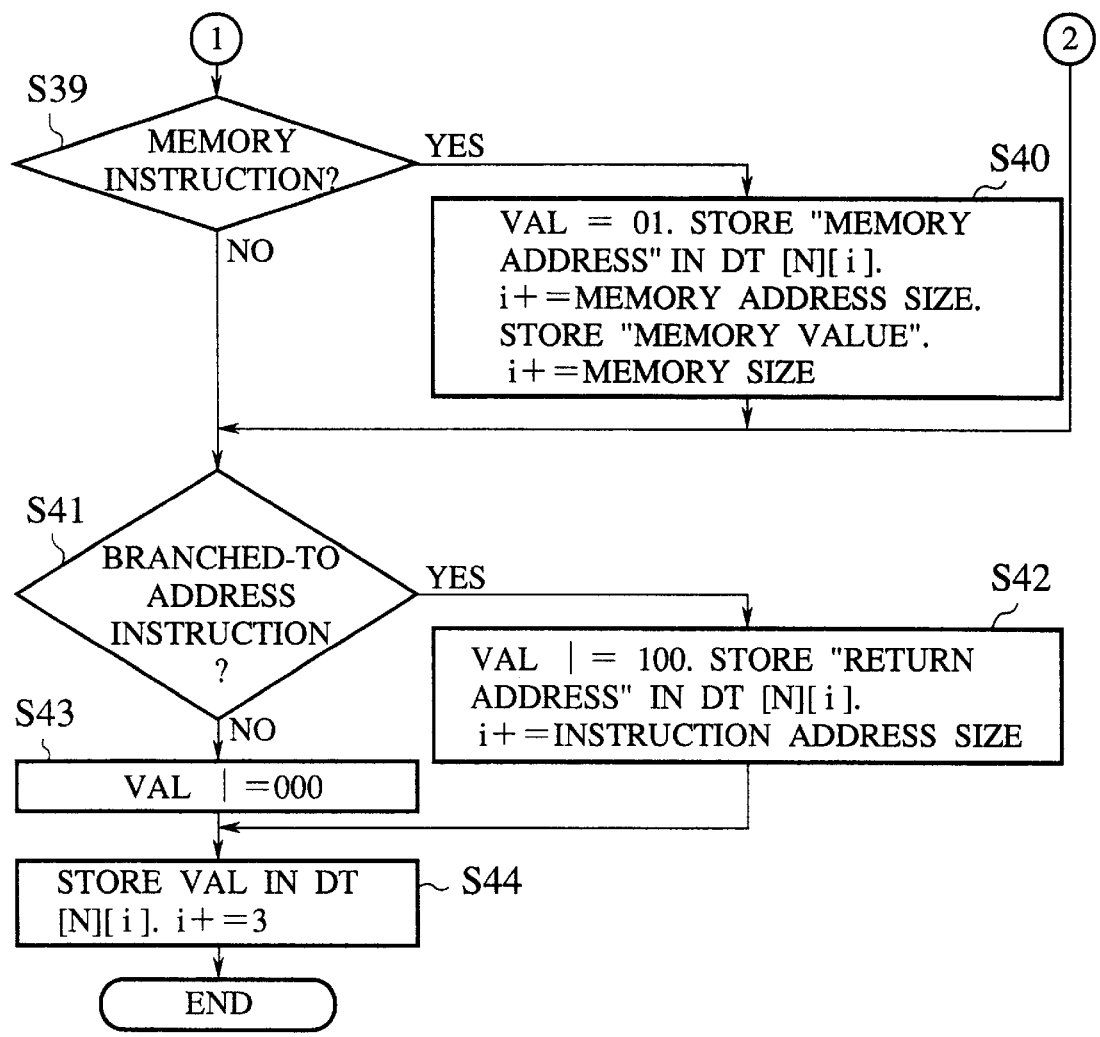

FIGS. 8A and 8B show how the first data storage processing module 142 works when step execution is executed once. When the command entered into the simulation system specifies "execution", the above-described processing is repeated until the either end of the execution module or an breakpoint is reached. At this time, when there are M data storage tables and the last table, DT[M], is used, the system does not prepare the next table but use DT[1] again. In this case, data stored in the table is lost.

Figure 9A:
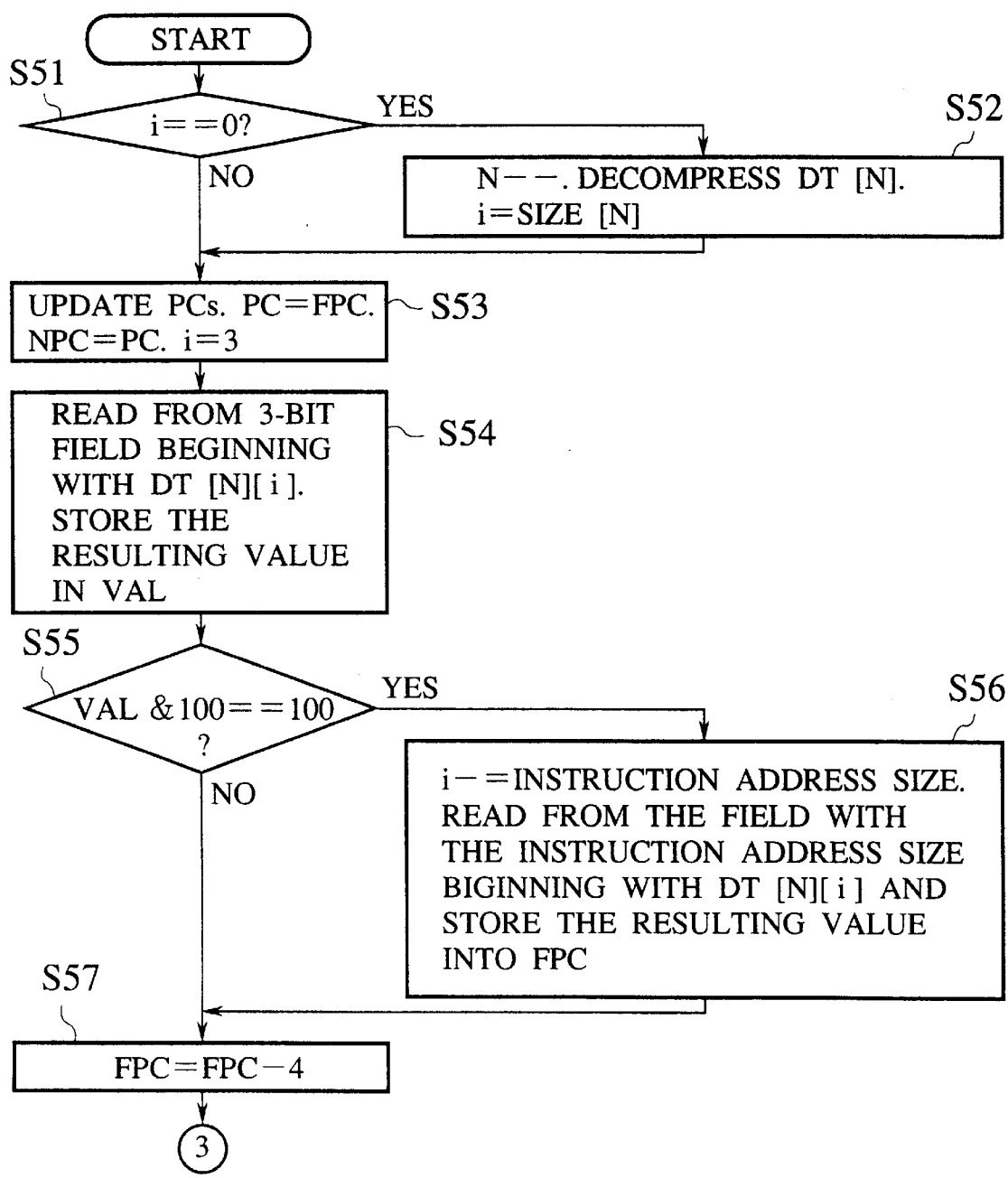
FIGS. 9A and 9B are flowcharts showing processing performed by a first data restoration processing module.
Figure 9B:
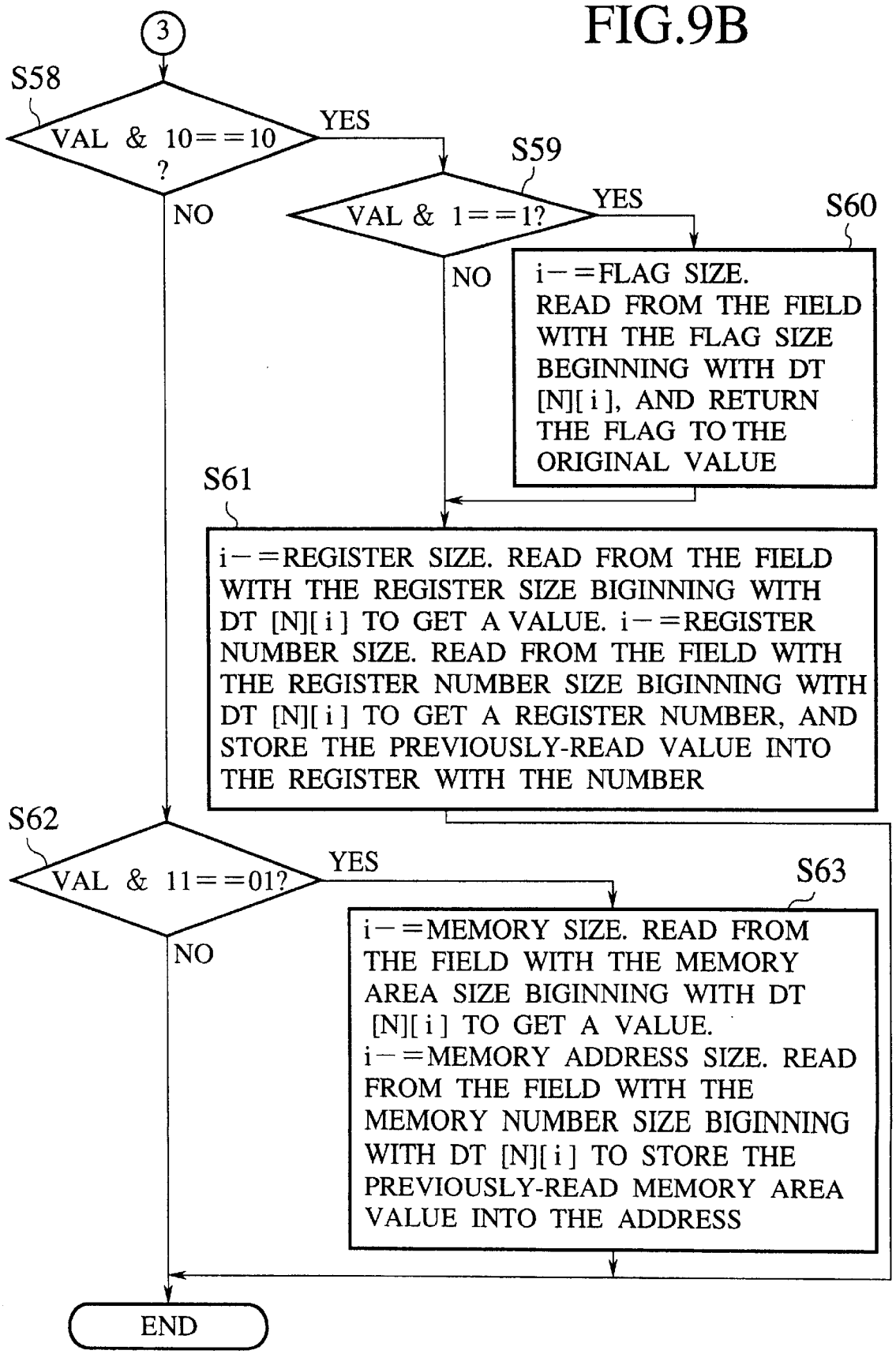

Next, UNDO execution processing is described. When the command entered into the simulation system specifies "UNDO step executions", data restoration processing is executed. Processing performed by the first data restoration processing module 151 is described with reference to FIGS. 9A and 9B.

In step S51, if the counter i pointing to an address within the data storage table DT[N] contains 0, the module decompresses the immediately preceding table and assigns the size of DT[N], SIZE[N], to i so that i points to the end of the new table(step S52).

In step S53, the program counters are updated. That is, the content of the FPC is set in the PC, and the content of the PC is set in the NPC. Each of these program counters now contains the value for the immediately-preceding instruction. is decremented by 3, and the 3-bit value is read from DT[N][i] into the variable VAL (step S54).

In step S55, if the value produced by ANDing VAL and "0b100" is "0b100", then the instruction stored in this table is a branch instruction. Thus, in step S56, the instruction address size is subtracted from i, and the value is read from the field with the size of the instruction address beginning with DT[N][i]. The resulting value, which indicates the "branch-from address", is stored in the FPC.

In step S58, if the value produced by ANDing VAL and "0b10" is "0b10", then the instruction stored in this table is a register instruction. In step S59, if the low-order bit of VAL is 1, then the instruction is a flag-change instruction. In this case, the flag size is subtracted from i, the value is read from the field with the flag size beginning with DT[N][i], the flag is returned to the original value, and control goes to step S61.

In step S61, the register size is subtracted from i, the register value is read from the field with the register size beginning with DT[N][i], the register number size is subtracted from i, the register number is read from the field with the register number size beginning with DT[N][i], and the register value previously read is stored into the register with the register number.

In step S62, if the value produced by ANDing VAL and "0b11" is "0b10", then the instruction is a memory instruction. The memory area size is subtracted from i, the memory area value is read from the field with the memory area size beginning with DT[N][i], the memory address size is subtracted from i, the memory address is read from the field with the memory address size beginning with DT[N][i], and the memory area value previously read is stored in the memory address.

The processing flow of the simulation system of this embodiment is described using the example shown in FIG. 10. Because decimal numbers, hexadecimal numbers, and binary numbers are mixed in this example, a decimal number is shown with no prefix. A hexadecimal number is prefixed with "0x", and a binary number with "0b" as in the above description.

Assume that simulation has been performed up to address 0x11fc. Therefore, currently, PC=0x1200 and NPC=0x1204. Also assume that the third data storage table DT[3] is being used (N=3), that the counter pointing to an address within the table contains 3159 (i=3159), and that the table size, SIZE is 3200.

Although a program that is input to the simulation system is actually in the object code format and the simulation system identifies each instruction only after execution of the decode processing module 141, the program is described as shown in FIG. 10 for convenience.

Now, processing continues with address 0x1200. When it is found in step S16 in FIG. 7 that the command specifies "step execution", the mnemonic and the operands of the instruction at address 0x1200 are obtained by the decode processing module 141 and control is passed to the first data storage processing module 142.

The first data storage processing module 142 performs the following processing:

Step S31: Control goes to S33 because i is now 3159.

Step S33: Control goes to step S35.

Step S35: The instruction at address 0x1200 is an "flag-change instruction" which changes the flag and stores a value in the register. Therefore, control goes to step S36.

Step S36: "0b11" is stored in the variable VAL. The register number "7", which is specified as the destination operand, is stored in the field with the register number size of 6 bits beginning with DT[3][3159], and i is incremented by "6". The register value "0x80" is stored in the field with the register size of 32 bits beginning with DT[3][3165], and i is incremented by "32". The flag value "0b0001" is stored in the field with the flag size of 4 bits beginning with DT[3][3196], and i is incremented by 4. Control goes to step S41.

Step S41: The PC containing the address of the current instruction is compared with the PC containing the address of the previous instruction, i.e. FPC. Because the current instruction is one instruction away from the previous instruction, it is found that the instruction is not a branch instruction. Control goes to step S43.

Step S43: VAL is ORed with "0b000". Control goes to step S44.

Step S44: VAL is stored in the 3-bit field beginning with DT[3][3200], and i is incremented by "3".

Step S173: The SUBCC instruction is executed by the instruction execution processing module 143.

Step S174: The PCs are updated. FPC=PC=0x1200, PC=NPC=0x1204, NPC=PC+4=0x1208.

Step execution processing for the instruction at address 0x1200 is finished. Control goes to step S13 to read the next input to the simulation system.

Step S16: It is found that "step execution" is specified.

Step S171: The decode processing module 141 decodes the instruction at address 0x1204. It is found that the instruction not a flag-change instruction, flag no-change instruction, memory instruction, or branched-to address instruction.

Step S172: The first data storage processing module 142 stores data. Control goes to step S31.

Step S31: i exceeds the table size (SIZE=3200) because i=3203. Control goes to step S32.

Step S32: DT[3] is compressed with the size of the data storage table DT[3], SIZE[3], being 3203. Control goes to step S33.

Step S33: Control goes to step S34 because i=0.

Step S34: N is incremented by 1, and DT[4] is created. Control goes to step S35.

Step S35: The instruction is not a flag change instruction. Control goes to step S37.

Step S37: The instruction is not a flag no-change instruction either. Control goes to step S39.

Step S39: The instruction is not a memory instruction either. Control goes to step S41.

Step S41: The instruction is not a branch instruction either. Control goes to step S43.

Step S43: "0b000" is assigned to VAL. Control goes to step S44.

Step S44: The value of VAL, "0b000", is stored in DT[4][0], and i is incremented by 3. Control goes to step S173.

Step S173: The CMP instruction at address 0x1204 is executed. Control goes to step S174.

Step S174: The PCs are updated. FPC=PC=0x1204, PC=NPC=0x1208, NPC=PC+4=0x120c.

Similarly, because the instruction at address 0x1208 is not a flag-change instruction, flag no-change instruction, memory instruction, or branched-to address instruction, the value of VAL (="0b000") is stored in the 3-bit field beginning with DT[4][3] and i is incremented by 3.

Step S174: The PCs are updated. Because the instruction at address 0x1208 is a branch instruction, the branch destination address is stored in the PC. FPC=PC=0x1208, PC=Branch destination address=0x1240, NPC=PC+4=0x1244.

Step S171: The instruction at address 0x1240 is decoded. This instruction is a flag no-change instruction which does not change the flag but stores a value in the register.

Steps S31 and S33: In both steps, control is passed to the "No" path. Control goes to step S35.

Step S35: Control goes to step S37 because the instruction is not a flag change instruction.

Step S37: Control goes to step S38 because the instruction is a flag no-change instruction.

Step S38: "0b10" is assigned to the variable VAL. The register number "9" is stored in the 6-bit (register number size) field beginning with DT[4][6], and i is incremented by "6". The register value "3" is stored in the 32-bit (register size) field beginning with DT[4][12], and i is incremented by "32". Control goes to step S41.

Step S41: Because the address in the PC for the current instruction is two or more instructions away from the address of the PC for the previous instruction, the instruction is a branched-to address instruction. Control goes to step S42.

Step S42: VAL is ORed with "0b100". The value of the FPC, which is the return address of "0x1208", is stored in the field with the size of the instruction address size of 32 bits beginning with DT[4][44], and i is in cremented by "32". Control goes to step S44.

Step S44: "0b110" is stored in DT[4][76], and i is incremented by 3.

At this point, tables DT[3] and DT[4] are as shown in FIG. 11A and FIG. 11B, respectively. As shown in these figures, the simulation system of this embodiment requires only 122 bits to create trace data that will be necessary for one instruction to be undone. Because the amount of trace data on one instruction is reduced, trace data on more instructions may be stored.

Next, how UNDO is executed is described. Assume that the LOAD instruction at address 0x1240 has been terminated. UNDO begins with this address. The associated variables contain the following values:

PC=0x1240, NPC=0x1240, FPC=0x1208, data storage table number N=4, i=79.

When it is found in step S20 in FIG. 7 that the command specifies "UNDO step execution", control goes to step S21 to perform data restoration processing.

Step S51: Because i is not 0, control goes to S53.

Step S53: The PCs are updated. NPC=PC=0x1240, PC=FPC=0x1208. i is decremented by 3. Control goes to step S54.

Step S54: The 3-bit value, "0b110", read from DT[4][76] is assigned to the variable VAL. Control goes to step S55.

Step S55: VAL is ANDed with "0b100". Because the result is "0b100" (high-order bit is 1), control goes to step S56.

Step S56: i is decremented by 32 (instruction address size), a value is read from the 32-bit field beginning with DT[4][44], and the value, "0x1208", is stored in the FPC. Control goes to step S57.

Step S57: FPC=FPC−4=0x1204. Control goes to step S58.

Step S58: Because VAL & "0b10" is "0b10", control goes to S59.

Step S59: Because the low-order bit of VAL is not 1, control goes to step S60.

Step S60: i is decremented by "32" (register size), a value is read from the field with the size of 32 bits beginning with DT[4][12] to get the register value 3. i is decremented by "6" (register number size), a value is read from the 6-bit field beginning with DT[4][6] to get the register number. The previously-read register value is restored to the register with the register number.

"UNDO step execution" is executed for the next instruction at address 0x1208 pointed to by the PC.

Step S51: Because i=6, control goes to step S53.

Step S53: The PCs are updated. NPC=PC=0x1208, PC=FPC=0x1204. i is decremented by 3. Control goes to step S54.

Step S54: A 3-bit value is read from DT[4][3] and the value that was read, "000", is stored in VAL. Control goes to step S55.

Step S55: Control goes to step S57.

Step S57: FPC=FPC−4=0x1200. Control goes to step S58.

Step S58: Control goes to step S62.

Step S62: Processing ends.

The CMP instruction at address 0x1204 pointed to by the PC is processed similarly. That is, i is decremented by 3 and a 3-bit value is read from DT[4][0]. Because the instruction type is "0b000", FPC=FPC−4=0x1200, and processing ends.

UNDO is executed for the next instruction at address 0x1200 pointed to by the PC.

Step S51: Because i is 0, control goes to step S52.

Step S52: N is decremented by 1, and the compressed data storage table DT[3] is decompressed. i is set to SIZE[3] (=3203). Control goes to step S53.

Step S53: The PCs are updated. NPC=PC=0x1200, PC=FPC=0x11fc. i is decremented by 3 and control goes to step S54.

Step S54: A 3-bit value is read from DT[3][3200] and the value, "0b011", is assigned to VAL. Control goes to step S55.

Step S55: Because the high-order bit is not 1, control goes to step S57.

Step S57: FPC=FPC−4=0x11f8. Control goes to step S58.

Step S58: Because VAL & "0b10" is "0b10", control goes to step S59.

Step S59: Because the low-order bit of VAL is 1, control goes to step S60.

Step S60: i is decremented by 4 (flag size), a 4-bit value is read from DT[3][3196], and the value, "0b00001", is restored to the flag. Control goes to step S61.

Step S61: i is decremented by 32 (register size) and a 32-bit value is read from DT[3][3165] to get the register value "0x80". i is decremented by 6 (register number size) and a 6-bit value is read from DT[3][3159] to get the register number "7". The value "0x80" is restored to register 7.

At this time, it is also possible to change the values of registers Reg9 and Reg2 with a command that is entered into the simulation system in order to perform step execution or execution beginning with address 0x1200. Currently, the following values are set:

PC=0x11fc, NPC=0x1200, FPC=0x11f8, data storage table number N=3, i=3159.

As described above, the simulation system of this embodiment allows the user to undo executed instructions two or more times and to store trace data specific to the type of each instruction. Therefore, because the amount of trace data on one instruction necessary to undo it is reduced, trace data on more instructions may be stored Second embodiment The terms used in this embodiment that are added to those of the first embodiment are described.

In this embodiment, when an operation "A+B→C", "A−B→C", or "A×B→C" is executed, A is called a "first operand", B is called a "second operand", and C is called a "third operand".

A reversible instruction refers to an instruction which, after an operation is executed, the first operand may be restored by the second and third operands. For example, "A+B→A" is called a reversible addition instruction, "A−B→A" is called a reversible subtraction instruction, and "A×B→A" is called a reversible multiplication instruction. The restoration instructions for the above instructions are subtraction, addition, and division, respectively.

Figure 12:
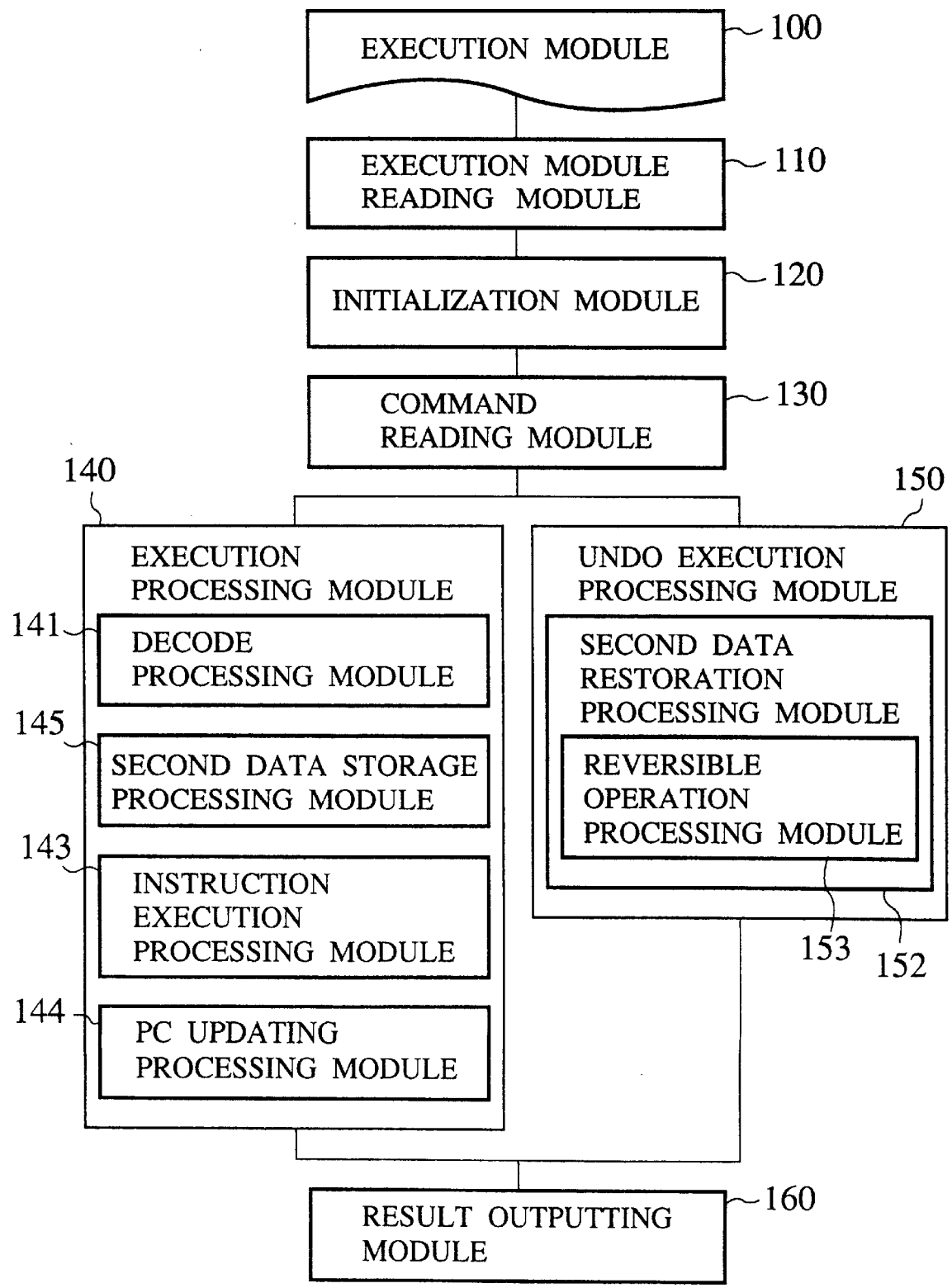
FIG. 12 is a block diagram showing the configuration of a simulation system according to a second embodiment of the present invention.

FIG. 12 shows the configuration of a simulation system according to the second embodiment of the present invention. The simulation system shown in FIG. 12 has a second data storage processing module 145 in an execution processing module 140 of the first embodiment, and has a second data restoration processing module 152, which further contains a reversible operation processing module 153, in an UNDO execution processing module 150. FIG. 7 shows the outline of the simulation system shown in FIG. 12.

Figure 13A:
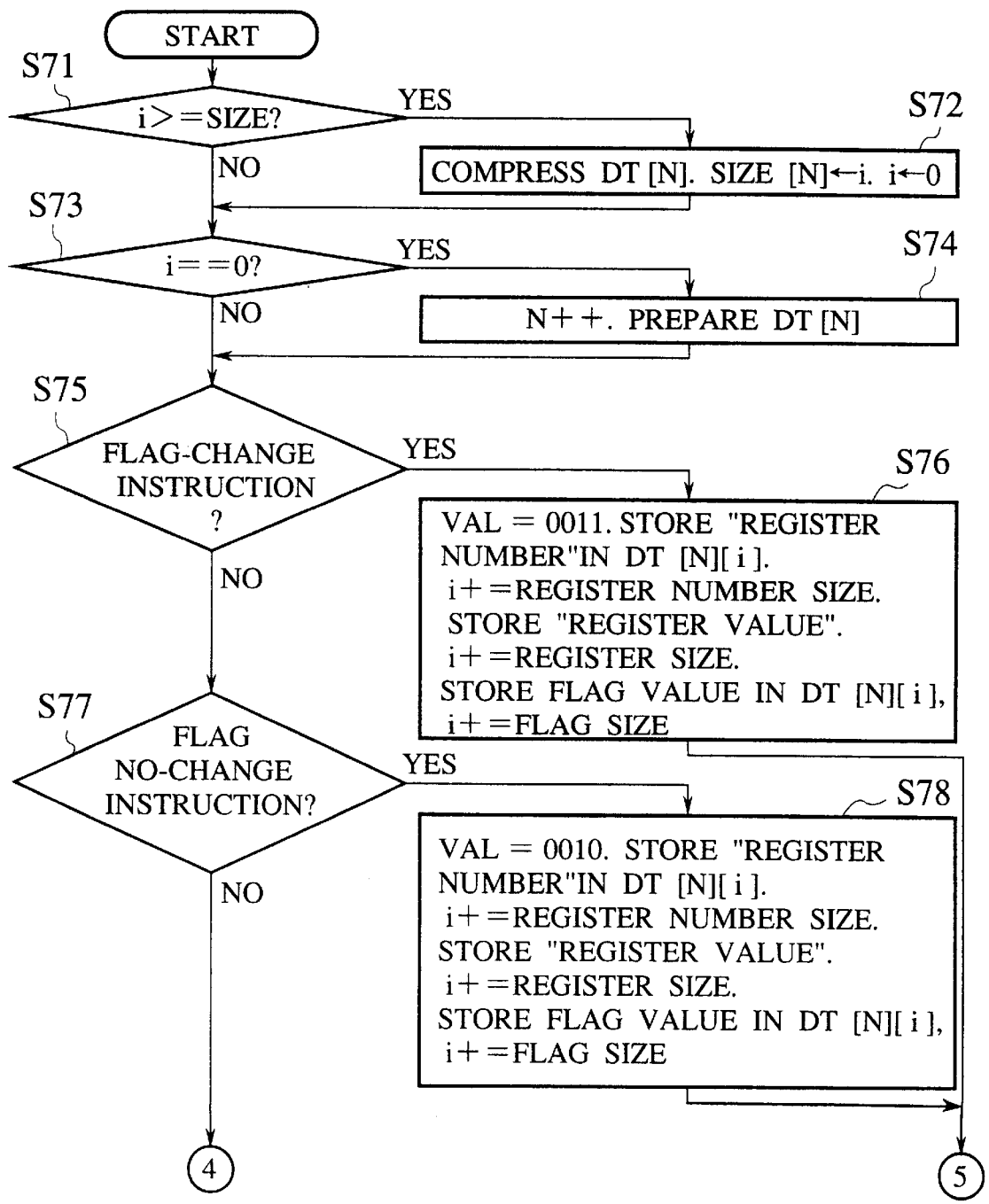
FIGS. 13A and 13B are flowcharts showing processing performed by a second data storage processing module.
Figure 13B:
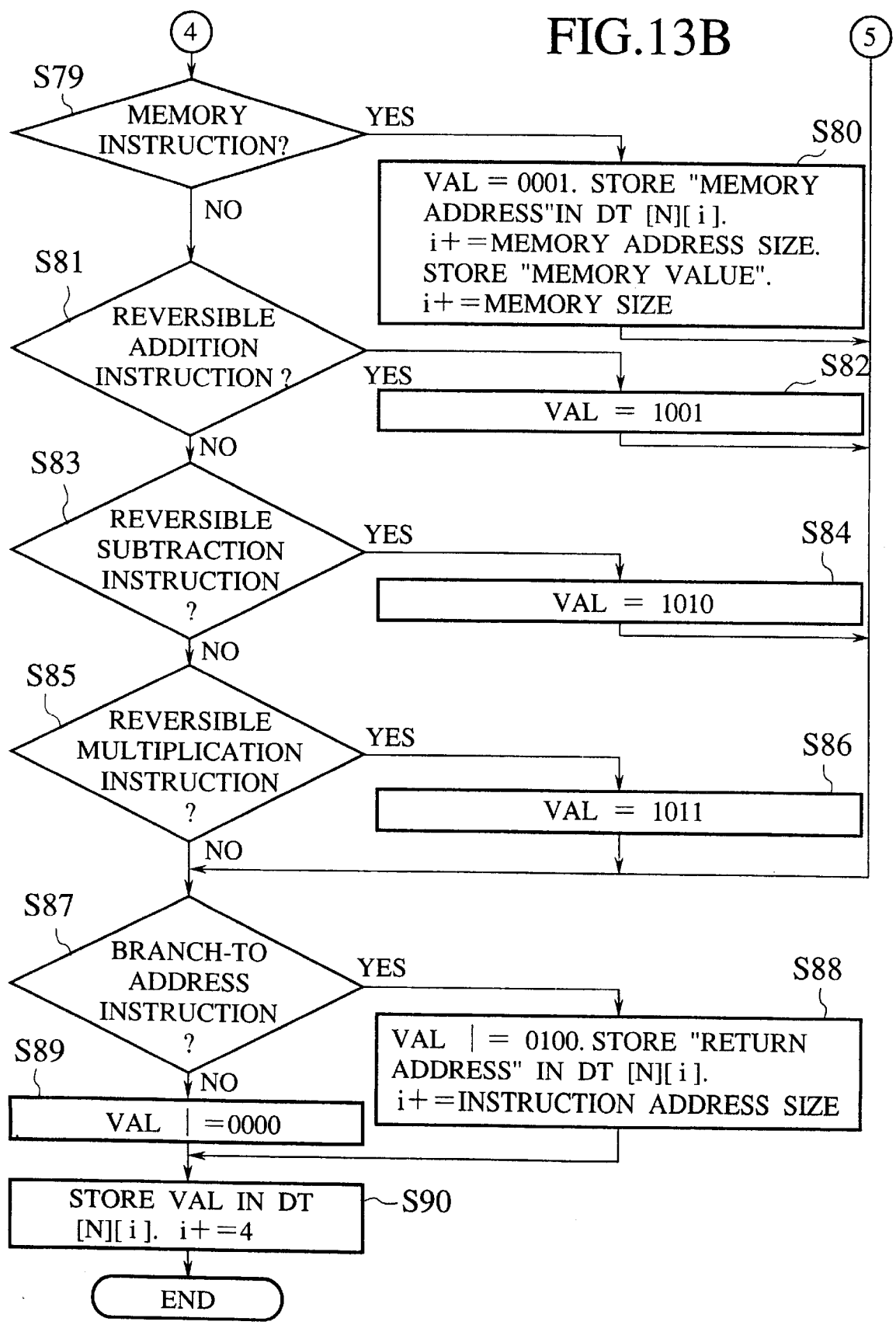

Next, processing performed by the second data storage processing module 145 shown in FIG. 12 is described with reference to FIGS. 13A and 13B. The second data storage processing module 145 is capable of identifying the instruction types "reversible addition instruction", "reversible subtraction instruction", and "reversible multiplication instruction" in addition to the types "flag change instruction, "flag no-change instruction", "memory instructions", and "branched-to address instruction" which are identified by the first data storage processing module of the first embodiment.

Because the number of instruction types is increased, the simulation system of the second embodiment has a instruction type field composed of four bits.

If the instruction is a "reversible addition instruction" in step S81, "0b1001" is assigned to VAL. If the instruction is a "reversible subtraction instruction" in step S83, "0b1010" is assigned to VAL. If the instruction is a "reversible multiplication instruction" in step S85, "0b1011" is assigned to VAL and control goes to step S87. At the same time, if the instruction is found to be a branched-to address instruction in step S87, VAL is ORed with "0b0100", the return address is stored in DT[N][i] in step S88, i is incremented by instruction number size, and control goes to step S90. If the instruction is not a branched-to address instruction, VAL is ORed with "0b0000" in step S89. The value of VAL is stored in DT[N][i], and i is incremented by 4 in step S90. The value of the third operand before execution and the register number are not stored in the table.

Figure 14A:
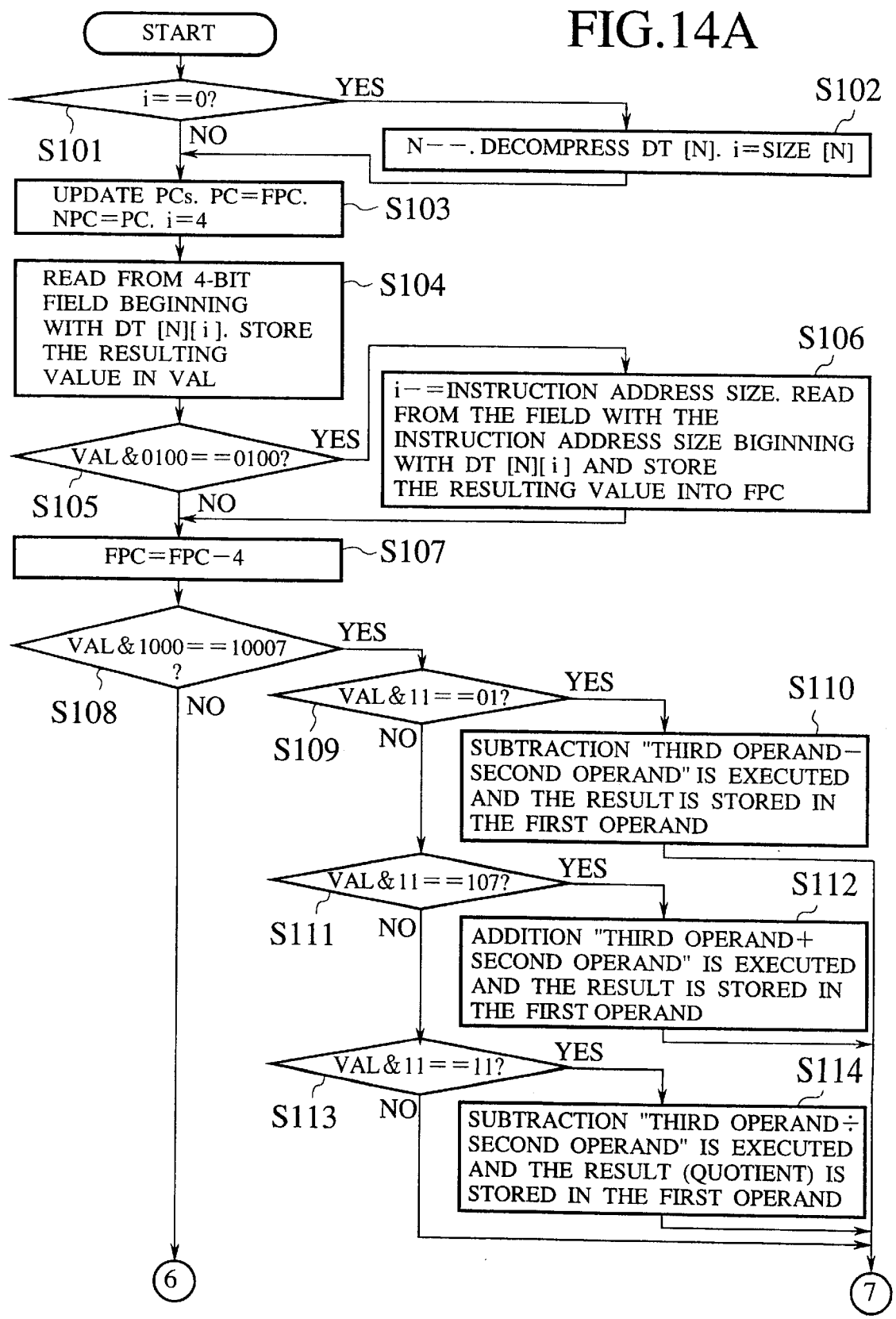
FIGS. 14A and 14B are flowcharts showing processing performed by a second data restoration processing module.
Figure 14B:
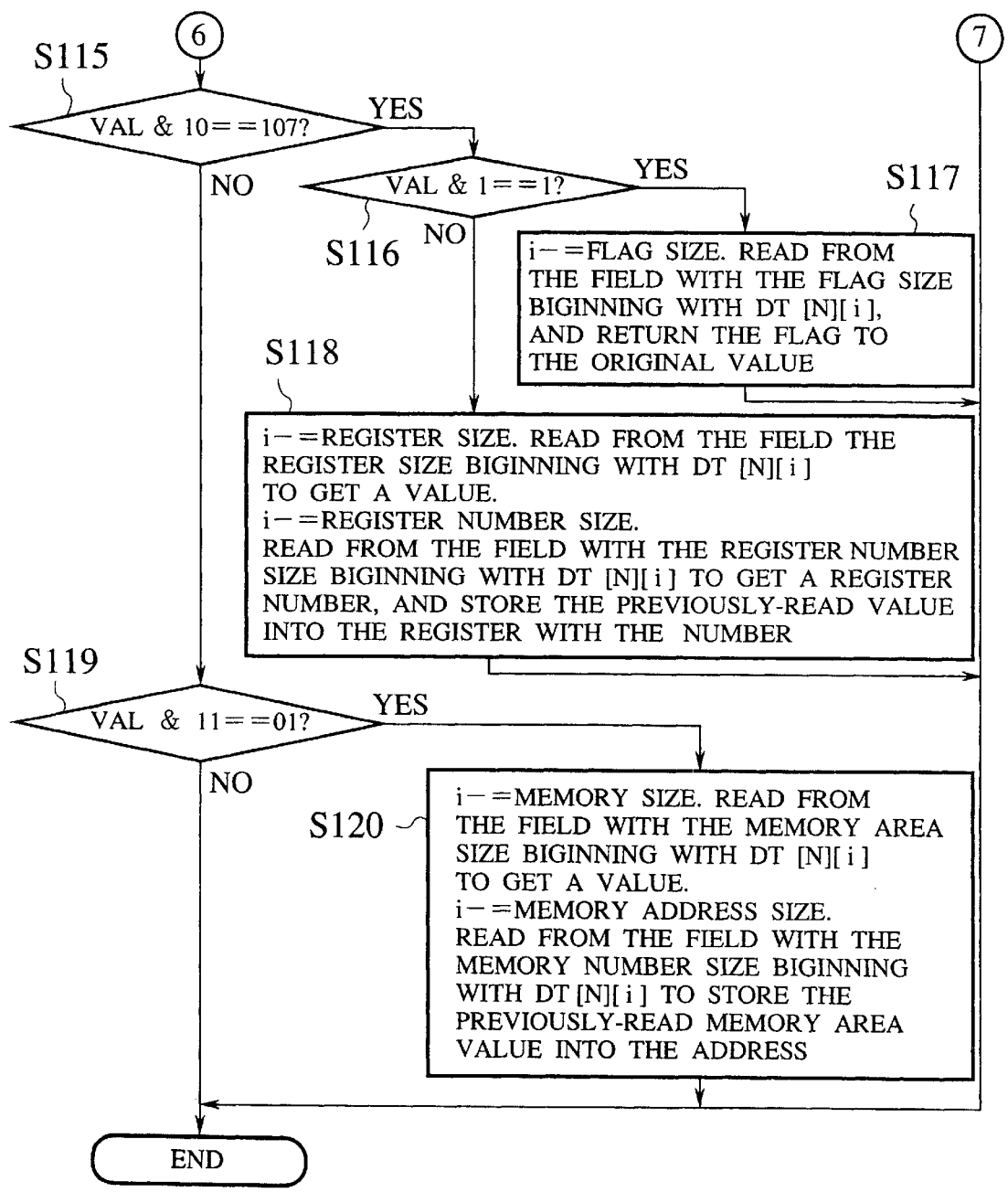

Next, the second data restoration processing module is described with reference to FIGS. 14A and 14B. When the second data restoration processing module identifies the instruction types, it identifies instruction types "flag change instruction", "flag no-change instruction", "memory instruction", and "branched-to address instruction", as well as "reversible addition instruction", "reversible subtraction instruction", and "reversible multiplication instruction", and performs processing for each instruction type.

If the high-order bit of the 4-bit VAL is "1" in step S108, and the low-order two bits of VAL is "0b01" in step S109, subtraction "third operand−second operand" is executed in step S110 and the result is stored in the first operand to restore the value before execution. If the low-order two bits of VAL is "0b10" in step S111, addition "third operand+second operand" is executed in step S112 and the result is stored in the first operand to restore the value before execution. If the low-order two bits of VAL is "0b11" in step S113, division "third operand÷second operand" is executed in step S114 and the result is stored in the first operand to restore the value before execution.

FIGS. 13A to 14B show the flow of processing when the program shown in FIG. 15 is executed by the simulation system of the second embodiment.

As in the program in FIG. 11 of the first embodiment, assume that simulation has been performed up to address 0x11fc, that the data storage table DT[3] with the size of 3200 is being used, and that i which is a counter pointing to an address within the table contains 3159. Also assume that Reg2 contains 11 and Reg9 contains 14 immediately before the instruction at address 0x1200 is executed.

Now, processing continues with address 0x1200.

Step S83: Because the instruction at address 0x1200 is a reversible subtraction instruction, control goes to step S82.

Step S82: "0b1010" is assigned to VAL. Control goes to step S87.

Step S87: Because the instruction is not a branched-to address instruction, control goes to step S89.

Step S89: VAL is ORed with "00b000".

Step S90: The 4-bit VAL value "0b1010" is stored in DT[3][3159] and i is incremented by 4.

After that the instruction execution processing module 143 executes subtraction "Reg9−Reg2" and stores the result in Reg9.

FIG. 16 shows the data storage table after the above processing has been performed for the instructions including that at address 0x1240. The size of the data storage table DT[3], SIZE[3], is 3245. Therefore, the size of the table used in the second embodiment is 85 bits.

As described above, the simulation system used in this embodiment restores data by reversing operation if an instruction is a reversible instruction, further reducing the trace data area.

Next, assume that the instruction at address 0x1200 has been executed. How the instruction at address 0x1200 is undone is explained according to FIG. 14. i, which is the counter pointing to an address within the data storage table, contains "63."

Step S103: i (=63) is decremented by 4.

Step S104: A 4-bit value is read from DT[N][59] and value, "0b1010", is assigned to VAL.

Step S105: Because "VAL & 0b0100" is not "0b0100", control goes to step S107.

Step S107: The FPC is updated.

Step S108: Because the high-order bit of VAL is 1, control goes to step S109.

Step S109: Because "VAL & 0b11" is not "0b01", control goes to step S111.

Step S111: Because "VAL & 0b11" is not "0b10", control goes to step S112.

Step S112: The first operand of the instruction at address 0x1200 is Reg9 which contains 3, the second operand is Reg2 which contains 11, and the third operand is Reg9 which contains 3. "Third operand+second operand" is executed, and the result, 14, is stored in Register Reg9 after UNDO processing.

As described above, the simulation system of this embodiment allows the user to undo executed instructions two or more times and to save data according to the type of instruction. Because the amount of trace data on one instruction necessary to undo it is reduced, trace data on more instructions may be stored.

Third embodiment

Figure 17:
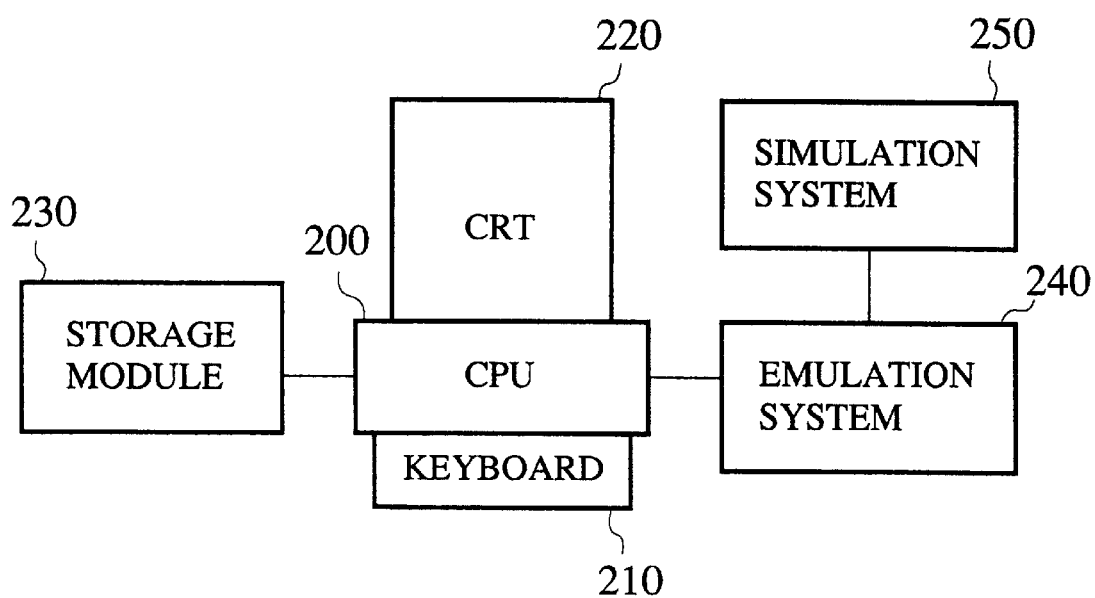
FIG. 17 is a block diagram showing the configuration of a simulation evaluation system according to a third embodiment of the present invention.

FIG. 17 is a diagram showing the configuration of a simulation evaluation system according to this embodiment of the present invention. The simulation evaluation system according to this embodiment comprises a storage module 230, a display 220, a CPU 200, a keyboard 210, an emulation system 240, and a simulation system 250, which was explained in the first or second embodiment, connected to the emulation system 240.

Figure 18:
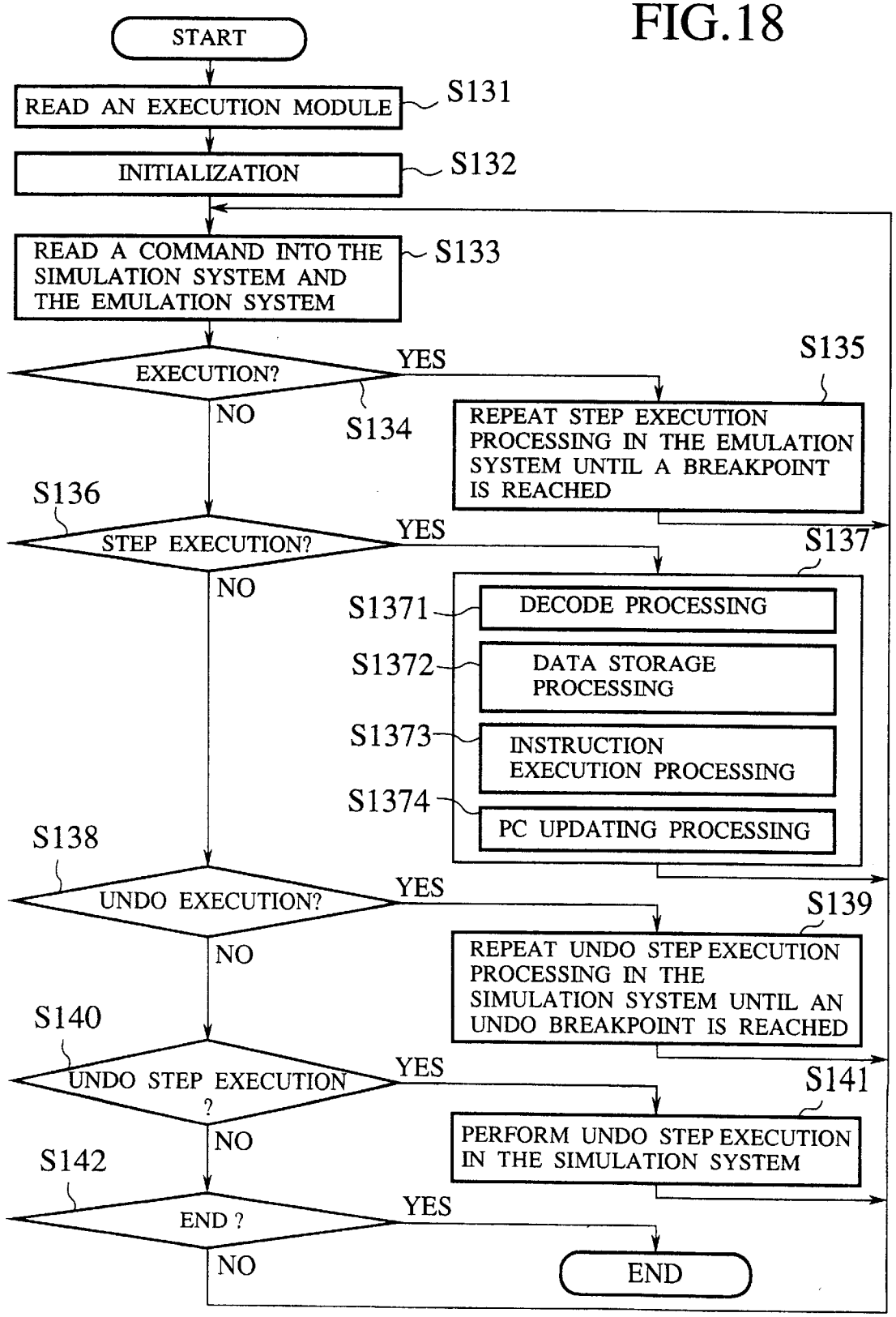
FIG. 18 is a flowchart showing a simulation method of the simulation evaluation system according to the third embodiment of the present invention.

FIG. 18 is a flowchart showing the processing flow of the simulation system shown in FIG. 17. The processing flow of the simulation system shown in FIG. 17 is described with reference to FIG. 18.

When a command such as "step execution", "UNDO step execution", or "UNDO execution" is entered from the keyboard 210, it is sent to the simulation system 250 and the emulation system 240 in step S133. If it is found in step S134 that the command is "execution", the emulation system 240 repeats "step execution" for the execution module until a breakpoint is reached or until the execution module ends (step S135).

If it is found in step S136 that the entered command is "step execution", the emulation system 240 performs step execution for the execution module (step S137). At this time, just as the simulation system of the first or second embodiment stores "instruction type", "values to be updated by instruction execution", and "branch source instruction address" into a data storage table before execution, the emulation system prepares a data storage table in the emulation system 240 or in the storage module 230 before execution and stores "instruction type", "values to be updated by instruction execution", and "branch source instruction address" into the table.

If it is found in step S138 that the entered command is "UNDO execution", the simulation system 250 repeats "UNDO step execution" for the execution module until an UNDO breakpoint is reached or until the beginning of the execution module is reached(step S139).

If it is found in step S140 that the entered command is "UNDO step execution", the simulation system 250 performs UNDO step execution for the execution module(step S141). In this case, data restoration processing is performed just like the simulation system of the first or second embodiment retrieves an "instruction type" from the data storage table and, based on each type, restores the "registers", "memory areas", and "flags" to the values before execution; and returns to a branch source address.

In order for the emulation system 240 to perform execution or step execution of the execution module after the simulation system 250 performs UNDO execution or UNDO step execution, execution must be resumed at the address indicated by the PC returned during UNDO processing.

A program implementing the above-described simulation method may be stored on a recording memory. The above simulation method may be executed by reading the program from the recording memory into a computer system while executing the program under control of the computer. The recording media include whatever devices capable containing the program such as memory devices, magnetic disk devices, and optical disk devices.

It should be understood that many modifications and adaptations of the invention will become apparent to those skilled in the art and it is intended to encompass such obvious modifications and changes in the scope of the claims appended hereto.

What is claimed is:

1. A simulation system which stores an instruction type and only stores updates amongst a register value, a flag value, a branch source address, and a memory area value that are updated by instruction execution according to the instruction type for use as trace data when an instruction is executed and which performs restoration processing using said trace data according to the instruction type when the instruction is restored to a state before execution.

2. A simulation system comprising:

an execution module reading module for reading an execution module to be simulated;

an initialization module for initializing variables used for simulation;

a command reading module for reading a command indicating a simulation processing type;

an execution processing module for executing said execution module and for storing an instruction type and only storing updates amongst a register value, a flag value, a branch source address, and a memory area value that are updated by instruction execution according to the instruction type for use as trace data when the command read by the command reading module is a forward command; and an UNDO execution processing module for performing restoration processing using said trace data according to the instruction type when the command read by the command reading module is a backward command.

3. A simulation system according to claim 2, wherein said execution processing module comprises a first data storage processing module, when the command read by said command reading module is the forward command, while executing said execution module, for storing the type of the instruction being executed and selectively storing a register number and the register value if the register value is updated by executing said instruction, the flag value if the flag value is updated by executing said instruction, a memory area address and the memory area value if the memory area value is updated by executing said instruction, and the branch source address of a branched-to address instruction.

4. A simulation system according to claim 3, wherein said UNDO execution processing module comprises a first data restoration processing module, when the command read by said command reading module is the backward command, while undoing said execution module, according to the instruction type stored in said first data storage processing module, for restoring the stored register value into a register with the register number stored in said first data storage processing module if the register value is updated by executing said instruction, restoring the flag value stored in the first data storage processing module into a flag if the flag value is updated by executing said instruction, restoring the memory area value into a memory area with the address stored in the first data storage processing module if the memory area value is updated by executing said instruction, and restoring the branch source address into a program counter if the instruction is a branched-to address instruction.

5. A simulation system according to claim 2, wherein said execution processing module comprises a second data storage processing module, when the command read by said command reading module is the forward command, for storing the type of the instruction being executed while executing said execution module and wherein said UNDO execution processing module comprises a second data restoration processing module for restoring the instruction to the state before execution by reversing the instruction when the instruction is a reversible instruction.

6. A simulation evaluation system which stores information on an instruction when the instruction is executed by an emulation system and which restores the instruction to a state before execution using the information, wherein said simulation evaluation system stores an instruction type only stores updates amongst a register value, a flag value, a branch source address, and a memory area value that are updated by instruction execution according to the instruction type for use as trace data and, when the instruction is restored to the state before execution by said emulation system, performs data restoration processing using said trace data.

7. A simulation method comprising the steps of:

reading an execution module to be simulated;

initializing variables used for simulation;

reading a command indicating a simulation processing type;

executing said execution module, storing an instruction type, and only storing updates amongst a register value, a flag value, a branch source address, and a memory area value that are updated by instruction execution according to the instruction type for use as trace data when the command read by the command reading module is a forward command; and performing restoration processing using said trace data according to the instruction type when the command read by the command reading module is a backward command.

8. A computer-readable memory having stored therein a simulation program which stores information on an instruction when the instruction is executed and which restores said instruction to a state before execution using the information, said program comprising:

a step for reading an execution module to be simulated;

a step for initializing variables used for simulation;

a step for reading a command indicating a simulation processing type;

a step for executing said execution module, storing an instruction type, and only storing updates amongst a register value, a flag value, a branch source address, and a memory area value that are updated by instruction execution according to the instruction type for use as trace data when the command read by the command reading module is a forward command; and a step for performing restoration processing using said trace data according to the instruction type when the command read by the command reading module is a backward command.

* * * * *